United States Patent
Fenger

(10) Patent No.: US 11,732,695 B2
(45) Date of Patent: Aug. 22, 2023

(54) ROTOR BLADE CLAMPING TOOL

(71) Applicant: LIFTRA IP APS, Aalborg SV (DK)

(72) Inventor: Per Eske Fenger, Terndrup (DK)

(73) Assignee: LIFTRA IP APS, Aalborg SV (DK)

( * ) Notice: Subject to any disclaimer, the term of this patent is extended or adjusted under 35 U.S.C. 154(b) by 151 days.

(21) Appl. No.: 17/270,812

(22) PCT Filed: Sep. 13, 2019

(86) PCT No.: PCT/EP2019/074497
§ 371 (c)(1),
(2) Date: Feb. 23, 2021

(87) PCT Pub. No.: WO2020/053391
PCT Pub. Date: Mar. 19, 2020

(65) Prior Publication Data
US 2021/0190042 A1    Jun. 24, 2021

(30) Foreign Application Priority Data
Sep. 13, 2018 (DK) .......................... PA 2018 70586

(51) Int. Cl.
*F03D 13/10* (2016.01)
*B66C 1/10* (2006.01)

(52) U.S. Cl.
CPC .............. *F03D 13/10* (2016.05); *B66C 1/108* (2013.01); *F05B 2230/61* (2013.01)

(58) Field of Classification Search
CPC ... B66C 1/108; B66C 23/185; F05B 2230/61; F03D 13/10; F03D 80/50
See application file for complete search history.

(56) References Cited

U.S. PATENT DOCUMENTS

2015/0337799 A1   11/2015   Hansen et al.
2018/0257914 A1*   9/2018   Franke ...................... B66C 1/44

FOREIGN PATENT DOCUMENTS

| CN | 102135065 A | 7/2011 |
|---|---|---|
| CN | 102951548 A | 3/2013 |
| CN | 103723614 A | 4/2014 |
| CN | 107826970 A | 3/2018 |
| CN | 108147284 A | 6/2018 |
| CN | 207566735 U | 7/2018 |
| DK | 177338 B1 | 1/2013 |

(Continued)

*Primary Examiner* — Moshe Wilensky
(74) *Attorney, Agent, or Firm* — Birch, Stewart, Kolasch & Birch, LLP

(57) ABSTRACT

A rotor blade clamping tool includes a first and a second clamping element connected by by a clamping mechanism and each including a first and a second balancing lever being arranged pivotally about a pivot axis and having a first end flexibly connected with a corresponding first rotor blade contacting surface and a second end flexibly connected with a corresponding second rotor blade contacting surface. At least one clamping element includes a main balancing lever arranged pivotally about a main pivot axis and having a first end on which the corresponding first balancing lever is arranged pivotally and a second end on which the corresponding second balancing lever is arranged pivotally. First and second balancing levers arranged on the same main balancing lever are aligned in their longitudinal direction.

16 Claims, 16 Drawing Sheets

(56) References Cited

FOREIGN PATENT DOCUMENTS

Figure 1:
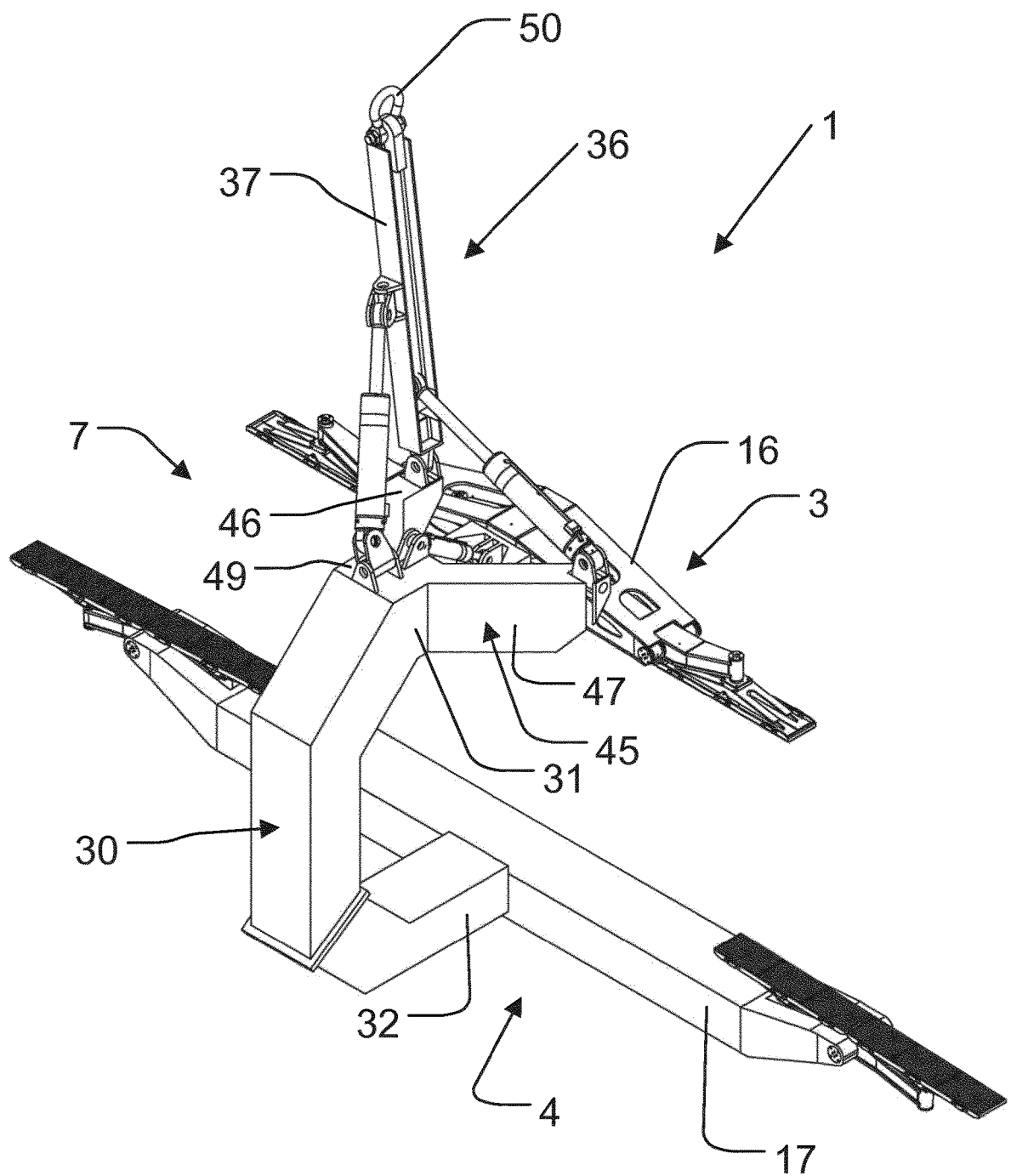

| | | |
|---|---|---|
| EP | 2 345 811 A1 | 7/2011 |
| EP | 2 559 890 A2 | 2/2013 |
| EP | 2 832 988 A1 | 2/2015 |
| EP | 2 873 641 A1 | 5/2015 |
| EP | 3 372 549 A1 | 9/2018 |
| JP | 2010-265752 A | 11/2010 |
| KR | 10-1334335 B1 | 11/2013 |
| WO | WO 2012/095112 A1 | 7/2012 |
| WO | WO 2017/108053 A1 | 6/2017 |
| WO | WO 2018/054440 A1 | 3/2018 |

\* cited by examiner

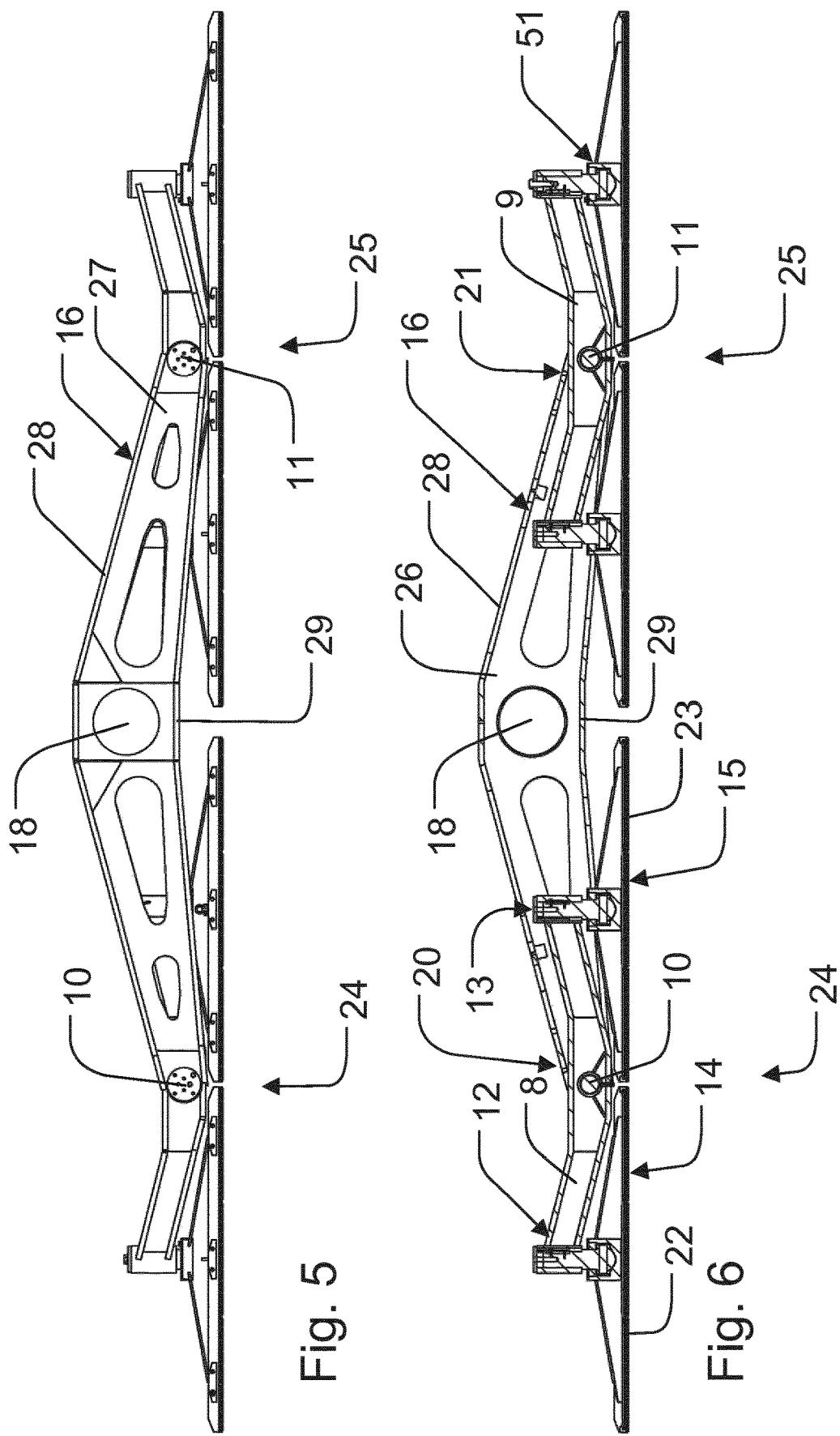

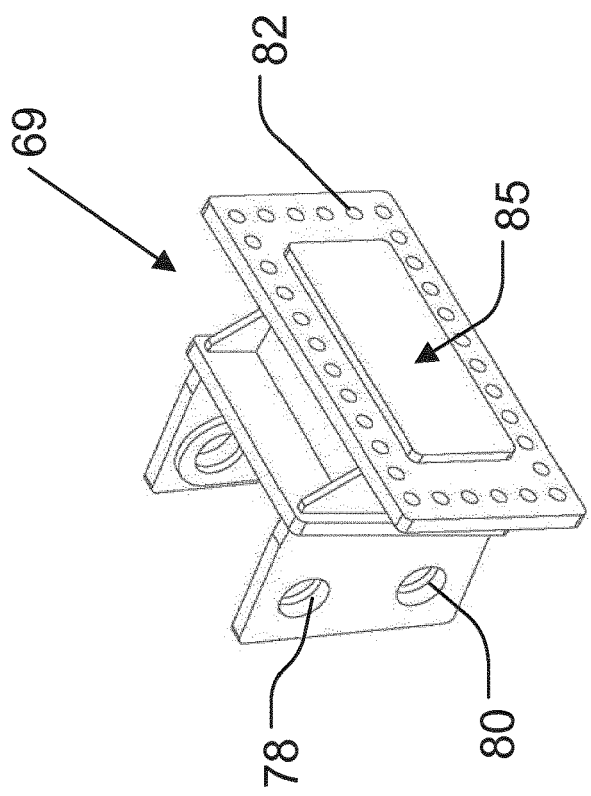
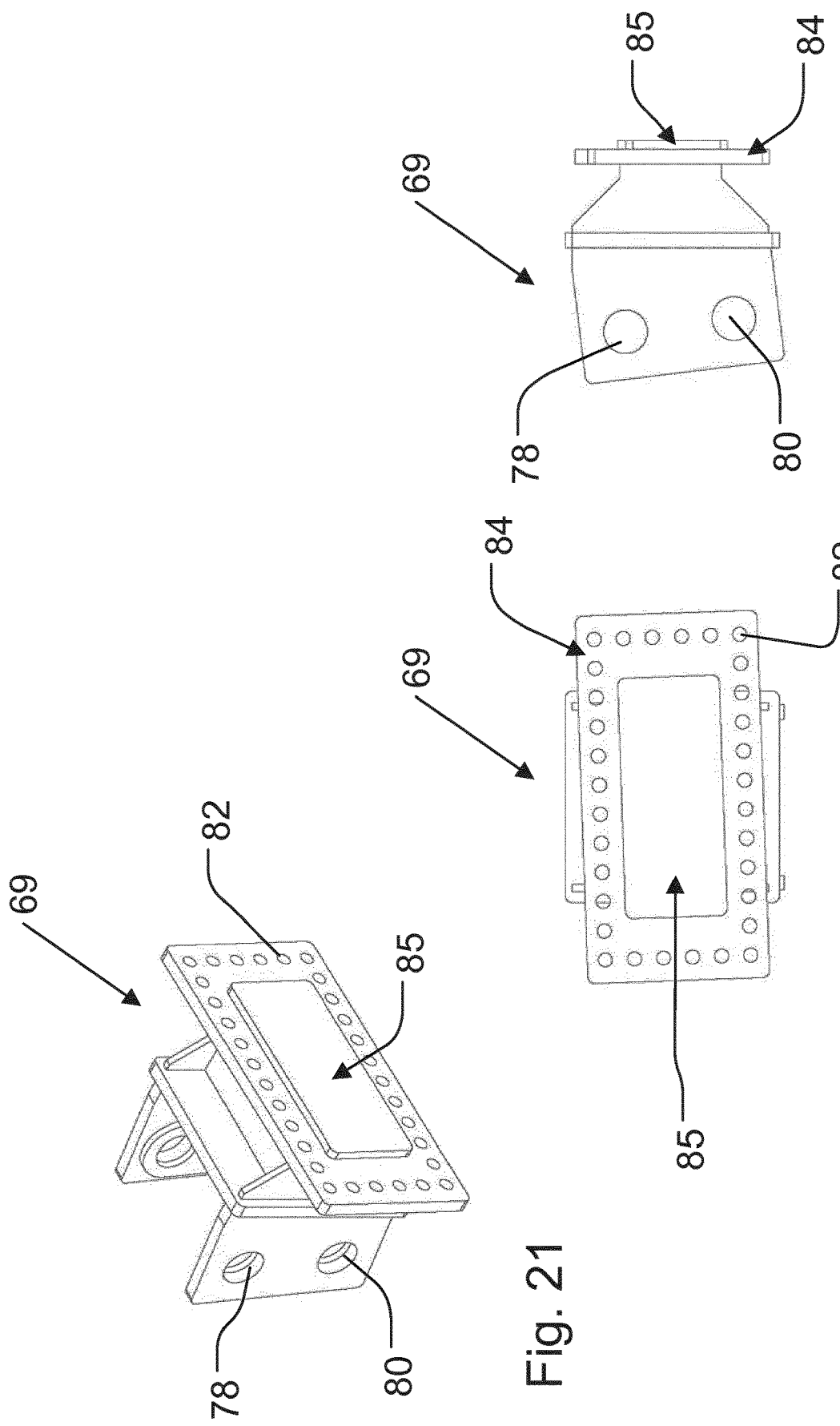

ROTOR BLADE CLAMPING TOOL

The present invention relates to a rotor blade clamping tool for lifting a wind turbine rotor blade, the clamping tool including a first clamping element adapted to be arranged at a first side of the rotor blade, a second clamping element adapted to be arranged at a second side of the rotor blade, and a clamping mechanism connecting the first clamping element and the second clamping element and being adapted to open the clamping tool for insertion of the rotor blade between the first and second clamping elements and close the clamping tool for clamping the rotor blade between the first and second clamping elements, at least one of the first and second clamping elements including a first balancing lever and a second balancing lever, each balancing lever being arranged pivotally about a pivot axis and having a first end flexibly connected with a corresponding first rotor blade contacting surface and a second end flexibly connected with a corresponding second rotor blade contacting surface.

WO 2012/095112 A1 (Liftra) discloses a tool for handling wind turbine rotor blades. The tool comprises a connecting arrangement having means for connection to a wire connected to a crane or hoist for hoisting the tool and a rotor blade held by the tool. The tool further comprises gripping means for engagement of the blade surface, wherein the gripping means has two cooperating claw-shaped sets of gripping organs driven by actuators, where each set of gripping organs comprises a first claw shaped organ and a second claw shaped organ, which together in engaged position encloses the blade surface around the entire circumference of the blade. However, as the cradle support extends beyond the structural core of the rotor blade into the more fragile area near its trailing edge, any mishandling is more likely to cause blade damage.

WO 2018/054440 A1 (Liftra) discloses a rotor blade clamping tool having a first clamping element adapted to be arranged at a first side of the rotor blade and a second clamping element adapted to be arranged at a second side of the rotor blade. Each one of the first and second clamping elements includes a first balancing lever and a second balancing lever, each balancing lever being arranged pivotally about a pivot axis and having a first end flexibly connected with a corresponding first rotor blade contacting surface and a second end flexibly connected with a corresponding second rotor blade contacting surface, wherein the first and second rotor blade contacting surfaces are arranged end to end and form a common rectangular elongated rotor contacting surface. The first and second balancing levers of each clamping element are arranged side by side in parallel configuration, but mutually slightly angled about their longitudinal axes so that the common rectangular elongated rotor contacting surfaces of the respective first and second balancing levers may contact the respective side of the rotor blade surface on different positions along the chord line and conform to the angle of the surface at that particular position.

EP 2 345 811 A1 discloses a clamp for clamping a blade for a wind turbine. The clamp comprises a first contact surface adapted to contact a portion of a back surface of the blade and a second contact surface adapted to contact a portion of a front face of the blade. The first and second contact surfaces of the clamp may be displaced relative to each other to allow removably receiving a blade therebetween. The first and second contact surfaces have an elongated rectangular shape and are each formed on a levelling piece having a wedge shaped form so that the contact surfaces may conform to the tapering shape of the rotor blade. However, it may be a disadvantage that the wedge shaped form of the levelling pieces has to be adapted to the specific shape of the rotor blades in question. As many different shapes of rotor blades exist, many different levelling pieces may have to be produced.

EP 3 372 549 A1 A discloses a C-gripper for arranging at a cross-member or at a suspension element and a cross-member having at least one such C-gripper for transporting loads. The height of the C-gripper is adjustable.

The object of the present invention is to provide a rotor blade clamping tool better suitable for handling heavy rotor blades of many different shapes.

In view of this object, the at least one of the first and second clamping elements includes a main balancing lever being arranged pivotally about a main pivot axis and having a first end on which the corresponding first balancing lever is arranged pivotally about a corresponding first pivot axis and a second end on which the corresponding second balancing lever is arranged pivotally about a corresponding second pivot axis, and first and second balancing levers arranged on the same main balancing lever are aligned in their longitudinal direction.

In this way, by clamping the rotor blade exclusively in the lengthwise direction of the blade by means of four separate rotor blade contacting surfaces arranged successively in the lengthwise direction and by automatically adapting the angle of each single rotor blade contacting surface to the angle of the rotor blade surface at the respective particular position, the clamping tool may carry the rotor blade directly on the spar cap/shear web and thereby avoid the more fragile areas away from the structural core of the rotor blade. Thereby, very heavy rotor blades of different shapes may be handled by the clamping tool.

In an embodiment, the four separate rotor blade contacting surfaces of the at least one of the first and second clamping elements are adapted to be arranged successively in the lengthwise direction of the rotor blade.

In an embodiment, the clamping tool is provided with a hoisting attachment arranged so that, during hoisting, the first clamping element is adapted to be arranged at a generally upward side of the rotor blade, and the second clamping element is adapted to be arranged at a generally downward side of the rotor blade, and the distance between the first and second pivot axes of the main balancing lever of the second clamping element is longer than, preferably at least 1.5 times, more preferred at least 2 times, and most preferred about 2.5 times, the distance between the first and second pivot axes of the main balancing lever of the first clamping element. Thereby, the support on the lower side of the rotor blade may be distributed over a longer part of the rotor blade, and thereby the rotor blade may be supported in an even more stable way.

In an embodiment, the first clamping element includes the main balancing lever arranged pivotally about the main pivot axis, the second clamping element includes a crossbar arranged on the clamping mechanism and having a first end on which a corresponding first balancing lever is arranged pivotally about a corresponding first pivot axis and a second end on which a corresponding second balancing lever is arranged pivotally about a corresponding second pivot axis, the first and second balancing levers arranged on the crossbar are aligned in their longitudinal direction, and the crossbar is fixed against rotation in relation to the clamping mechanism about any axis extending at least substantially in parallel with the main pivot axis of the first clamping element. Because the crossbar is fixed against rotation in relation to the clamping mechanism about any axis more or less parallel with the main pivot axis of the first clamping element, the wind turbine blade may be held in a fixed orientation in relation to the rotor blade clamping tool. Thereby, the handling of the wind turbine blade by means of the clamping tool may be facilitated.

In an embodiment, the clamping tool is provided with a hoisting attachment arranged so that, during hoisting, the first clamping element is adapted to be arranged at a generally upward side of the rotor blade, and the second clamping element is adapted to be arranged at a generally downward side of the rotor blade.

In an embodiment, the first rotor blade contacting surface and the second rotor blade contacting surface of each balancing lever has the form of respective longitudinal contact elements being aligned in their longitudinal direction and being arranged at least substantially end to end, but with enough clearance to allow mutual movement, thereby forming a total rotor blade contacting surface of the respective balancing lever.

In an embodiment, on the first clamping element, the total rotor blade contacting surface of the first balancing lever and the total rotor blade contacting surface of the second balancing lever are arranged at least substantially end to end, but with enough clearance to allow mutual movement, and, on the second clamping element, the total rotor blade contacting surface of the first balancing lever and the total rotor blade contacting surface of the second balancing lever are spaced at a distance being greater than the length of the total rotor blade contacting surface of the first or second balancing lever of the first clamping element, and preferably greater than 65 percent of, more preferred greater than 70 percent of, and most preferred greater than 75 percent of the combined length, on the first clamping element, of the total rotor blade contacting surface of the first balancing lever and the total rotor blade contacting surface of the second balancing lever. Thereby, the support on the lower side of the rotor blade may be distributed over a longer part of the rotor blade, and thereby the rotor blade may be supported in an even more stable way.

In a structurally particularly advantageous embodiment, the main balancing lever of the first clamping element includes a first and a second lever wall arranged in spaced and parallel configuration and being fixed to each other by means of a top plate and a bottom plate, and the corresponding first and second balancing levers extend at least partly between the first and second lever wall.

In another embodiment, each main balancing lever of the first and second clamping elements include a first and a second lever wall arranged in spaced and parallel configuration and being fixed to each other by means of a top plate and a bottom plate, and the corresponding first and second balancing levers extend at least partly between the first and second lever wall.

In an embodiment, the clamping mechanism connecting the first clamping element and the second clamping element includes a rigid C-formed bracket having a first leg and a second leg, a main bearing bracket for the main balancing lever of the first clamping element is hinged to the first leg of the C-formed bracket and is pivotal in relation to the first leg by means of a clamping actuator, and a main bearing for the main balancing lever of the second clamping element is arranged directly on the second leg of the C-formed bracket. Thereby, the clamping forces between the first clamping element and the second clamping element may be supported by means of a single rigid C-formed bracket which may be designed to a maximum load which may be determined based on the rotor blade to be carried. In this way, it may be avoided that the load is distributed over different brackets which each may have to be designed to a maximum load which may vary according to the way the rotor blade could be handled and therefore may have to be set relatively high.

In an embodiment, the clamping mechanism connecting the first clamping element and the second clamping element includes a rigid C-formed bracket having a first leg and a second leg, a main bearing bracket for a main balancing lever of the first clamping element is hinged to the first leg of the C-formed bracket and is pivotal in relation to the first leg by means of a clamping actuator, and the crossbar of the second clamping element is arranged on the second leg of the C-formed bracket by means of an exchangeable adapter piece bolted to the crossbar and arranged to maintain a certain angle between a longitudinal direction of the crossbar and an intermediate part of the rigid C-formed bracket connecting the first and second legs of the rigid C-formed bracket. Thereby, as for the embodiment mentioned above, the clamping forces between the first clamping element and the second clamping element may be supported by means of a single rigid C-formed bracket which may be designed to a maximum load which may be determined based on the rotor blade to be carried. In this way, it may be avoided that the load is distributed over different brackets which each may have to be designed to a maximum load which may vary according to the way the rotor blade could be handled and therefore may have to be set relatively high. Furthermore, by means of the exchangeable adapter piece bolted to the crossbar, an angle suitable for the specific wind turbine blade to be handled may be obtained between a longitudinal direction of the crossbar and an intermediate part of the rigid C-formed bracket. Thereby, the rigid C-formed bracket may for instance be handled with its intermediate part extending in an at least substantially vertical direction. Thereby, handling of the wind turbine blade may be facilitated.

In an embodiment, the exchangeable adapter piece is connected to the second leg of the C-formed bracket by means of a hinge having a hinge axis extending in the longitudinal direction of the crossbar so that the second clamping element is swingable between an insertion position for insertion of the rotor blade between the first and second clamping elements and a clamping position suitable for clamping the rotor blade between the first and second clamping elements. Thereby, insertion of the rotor blade between the first and second clamping elements may be facilitated.

In an embodiment, the second clamping element is swingable between the insertion position and the clamping position by means of a hydraulic actuator. Thereby, operation of the rotor blade clamping tool may be facilitated.

In an embodiment, the exchangeable adapter piece is adapted to be locked in the clamping position by means of a locking arrangement connecting the exchangeable adapter piece to the second leg of the C-formed bracket. Thereby, a hydraulic actuator for swinging the second clamping element between the insertion position and the clamping position may be dispensed with or such hydraulic actuator may not need to be dimensioned for carrying the clamping force of the rotor blade clamping tool.

In an embodiment, the intermediate part of the rigid C-formed bracket is provided with a transverse bar having opposed ends each being provided with a supporting piece adapted to support a leading edge or a trailing edge of a wind turbine blade held by the rotor blade clamping tool. Thereby, it may further be ensured that the rotor blade is held in a stable position by the clamping tool.

In an embodiment, the clamping tool is provided with a hoisting attachment in the form of a hoisting arm having a first end being connected to the clamping mechanism by means of a pivot element and a second end adapted to connect to a cable of a hoisting crane or the like, the pivot element allows pivotal movement of the hoisting arm in relation to the clamping tool about two different axes being at right angles to each other, and the hoisting arm is pivotal about said axes by means of a respective first and second hoist actuator. Thereby, the angle of the clamping tool and thereby the angle of the rotor blade carried by the tool may be varied during handling of the rotor blade so that, for instance, the blade may be positioned correctly in relation to the wind turbine hub when the blade is to be mounted thereon.

In a structurally particularly advantageous embodiment, the first leg of the C-formed bracket forms a fork element having a first leg and a second leg carrying a hinge axis therebetween on which the first clamping element is hinged to the first leg of the C-formed bracket, the first end of the hoisting arm is connected to the first leg of the fork element by means of the pivot element, the first hoist actuator is arranged between the second leg of the fork element and the hoisting arm, and the second hoist actuator is arranged between the first leg of the C-formed bracket or a central part of the fork element and the hoisting arm.

Figure 2:
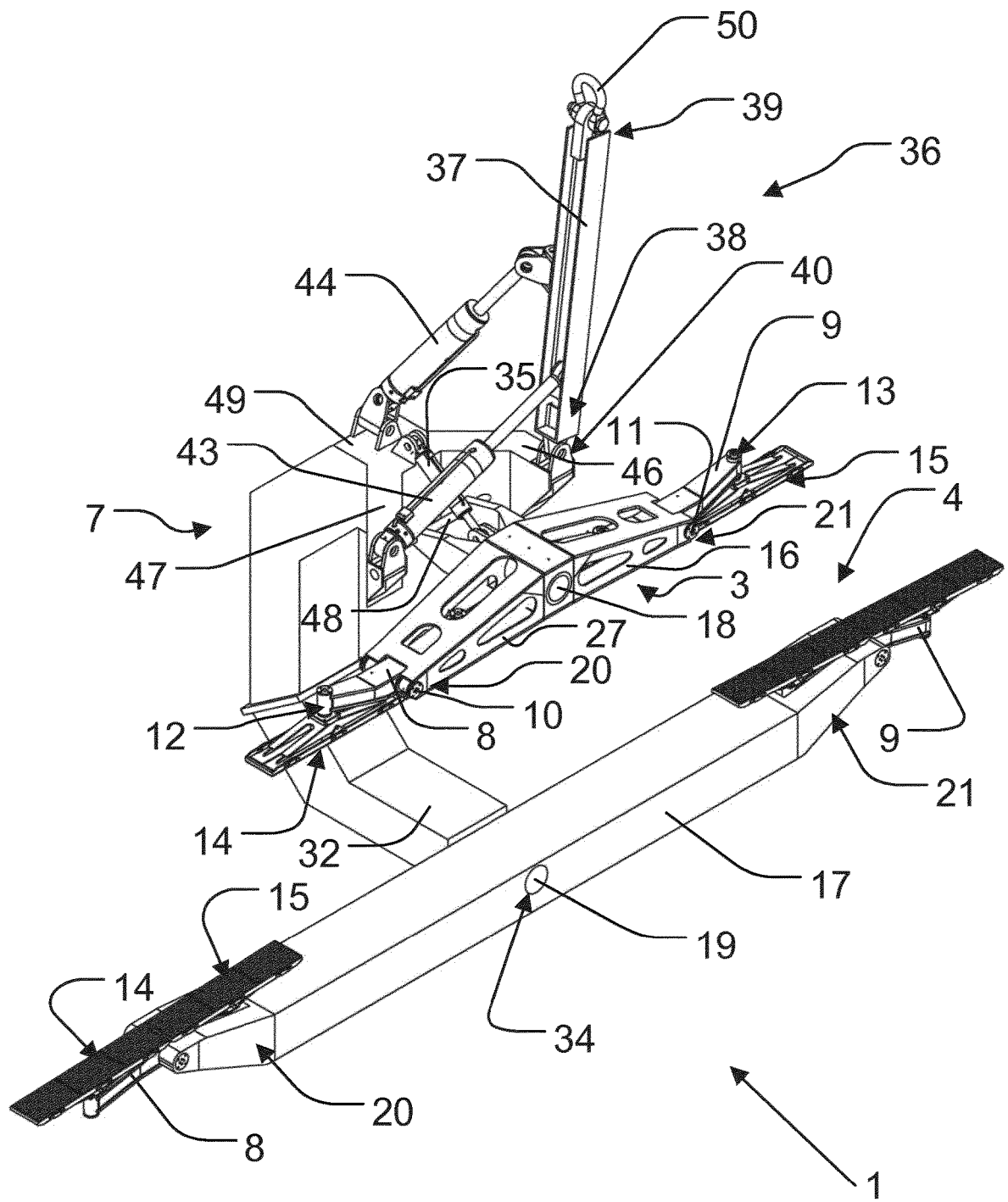
Figure 3:
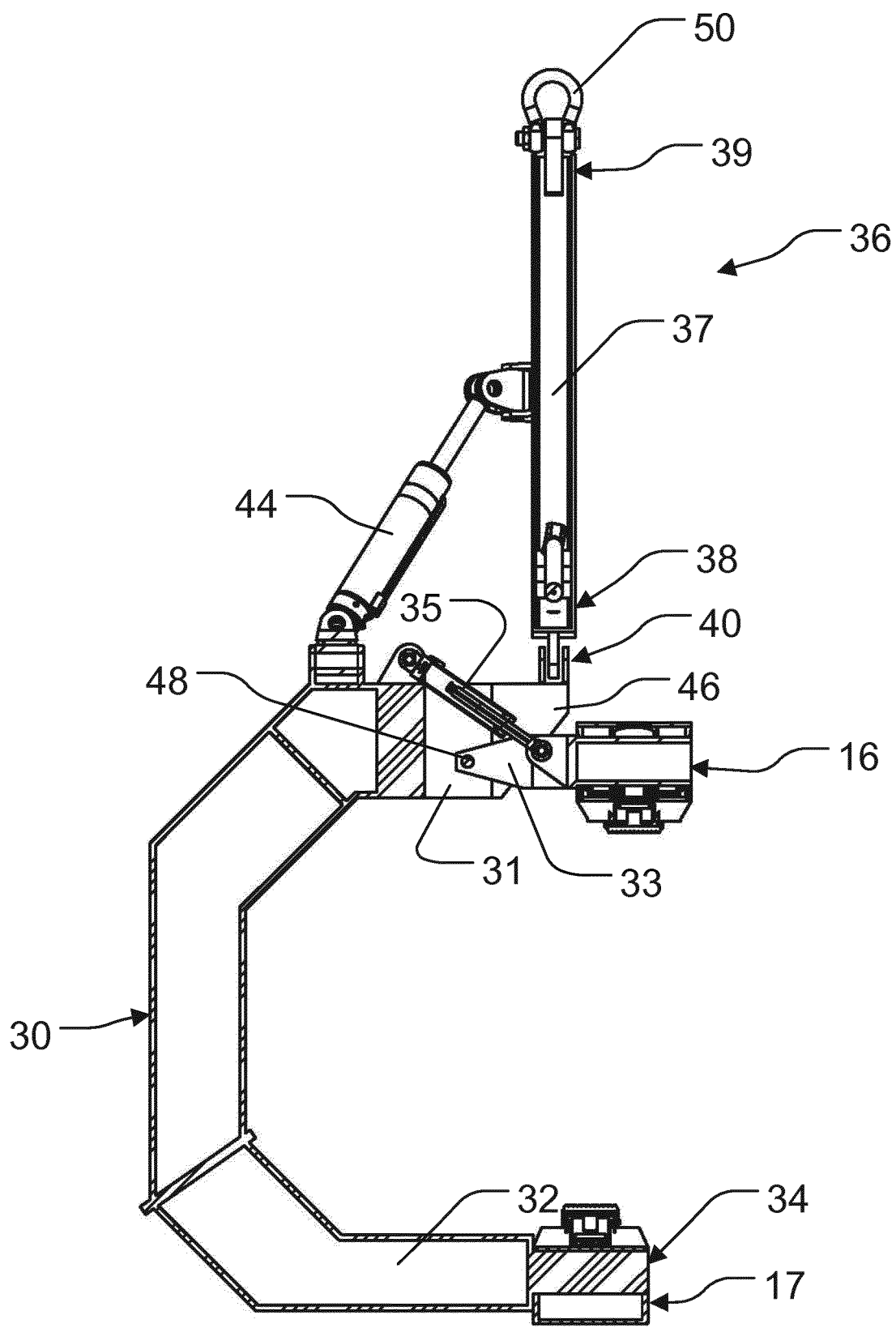
Figure 4:
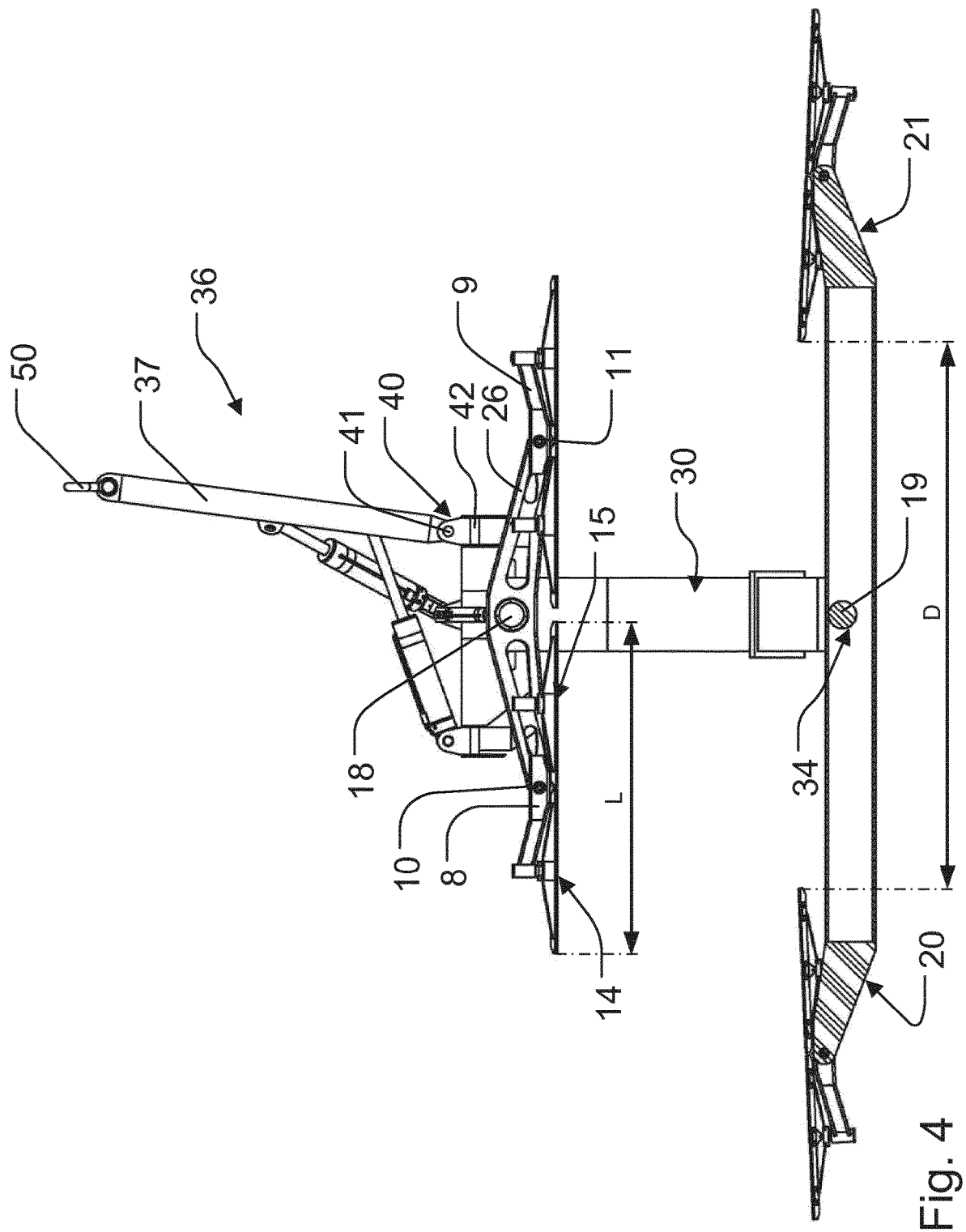
Figure 7:
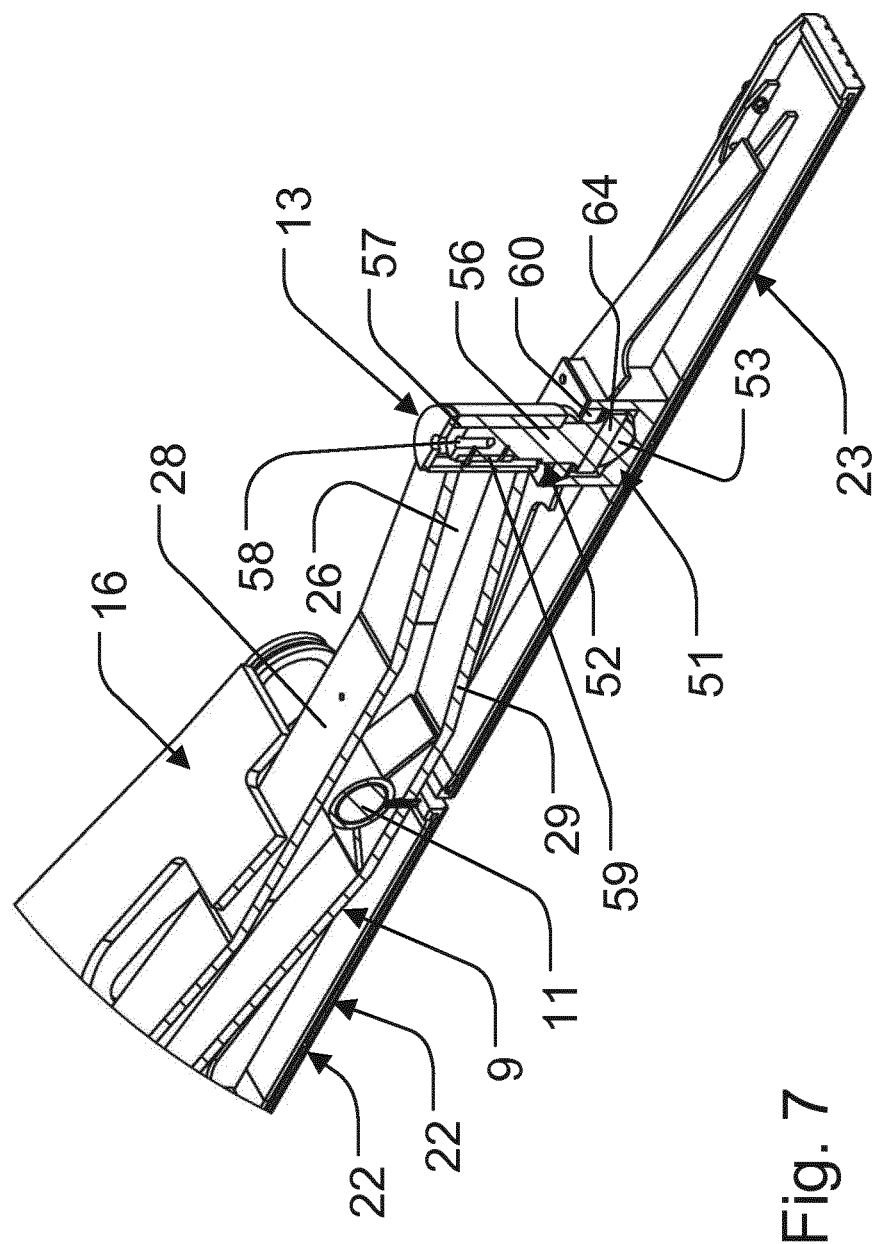
Figure 8:
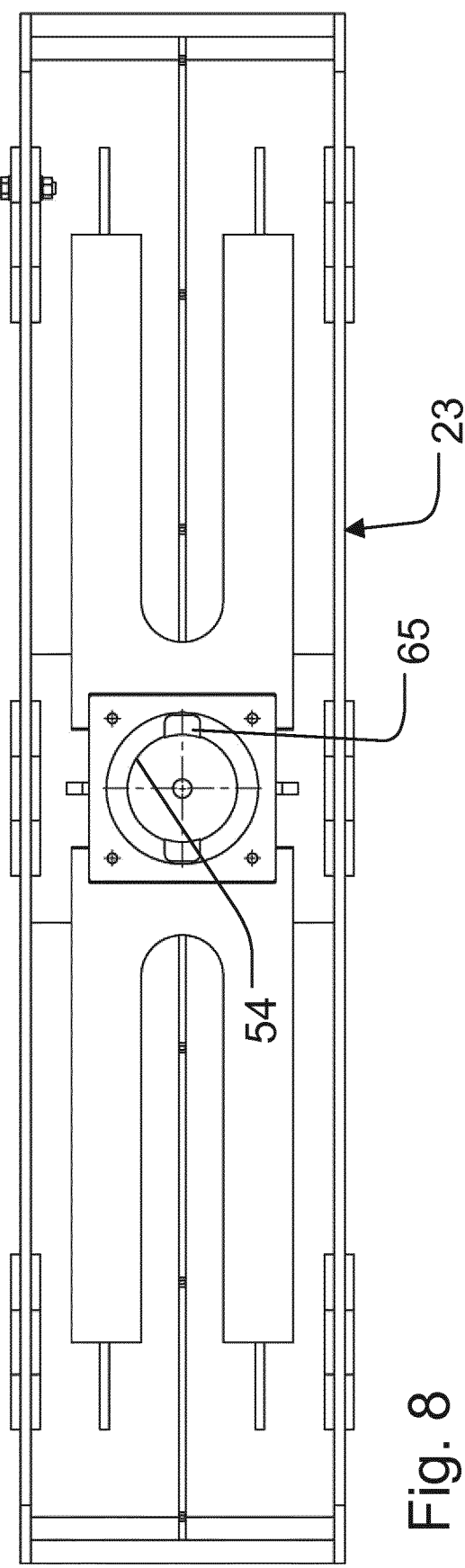
Figure 10:
Figure 9:
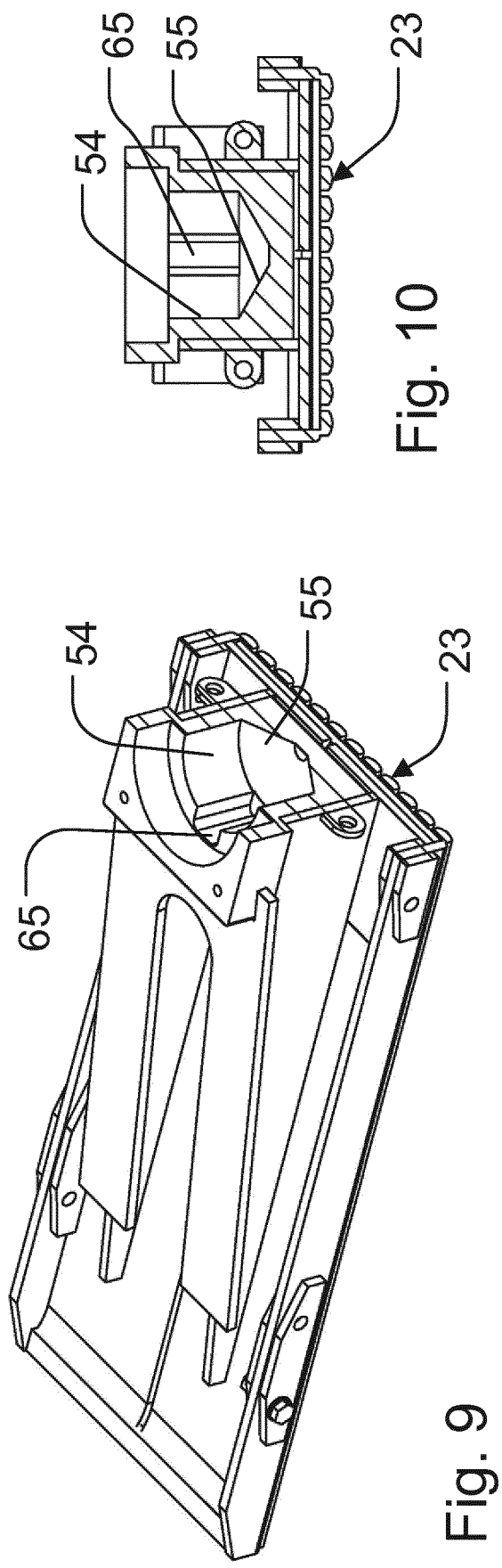
Figure 11:
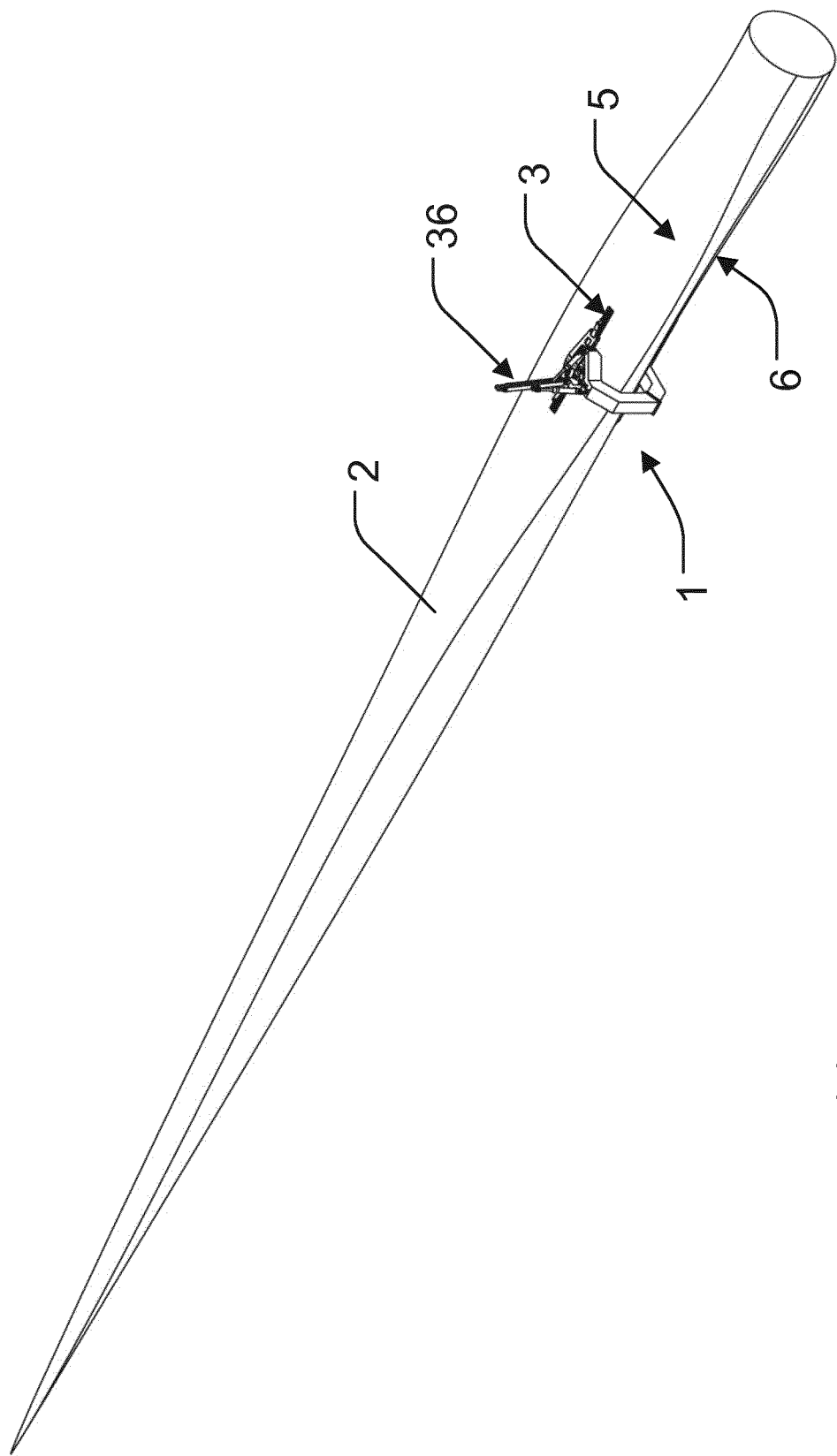
Figure 12:
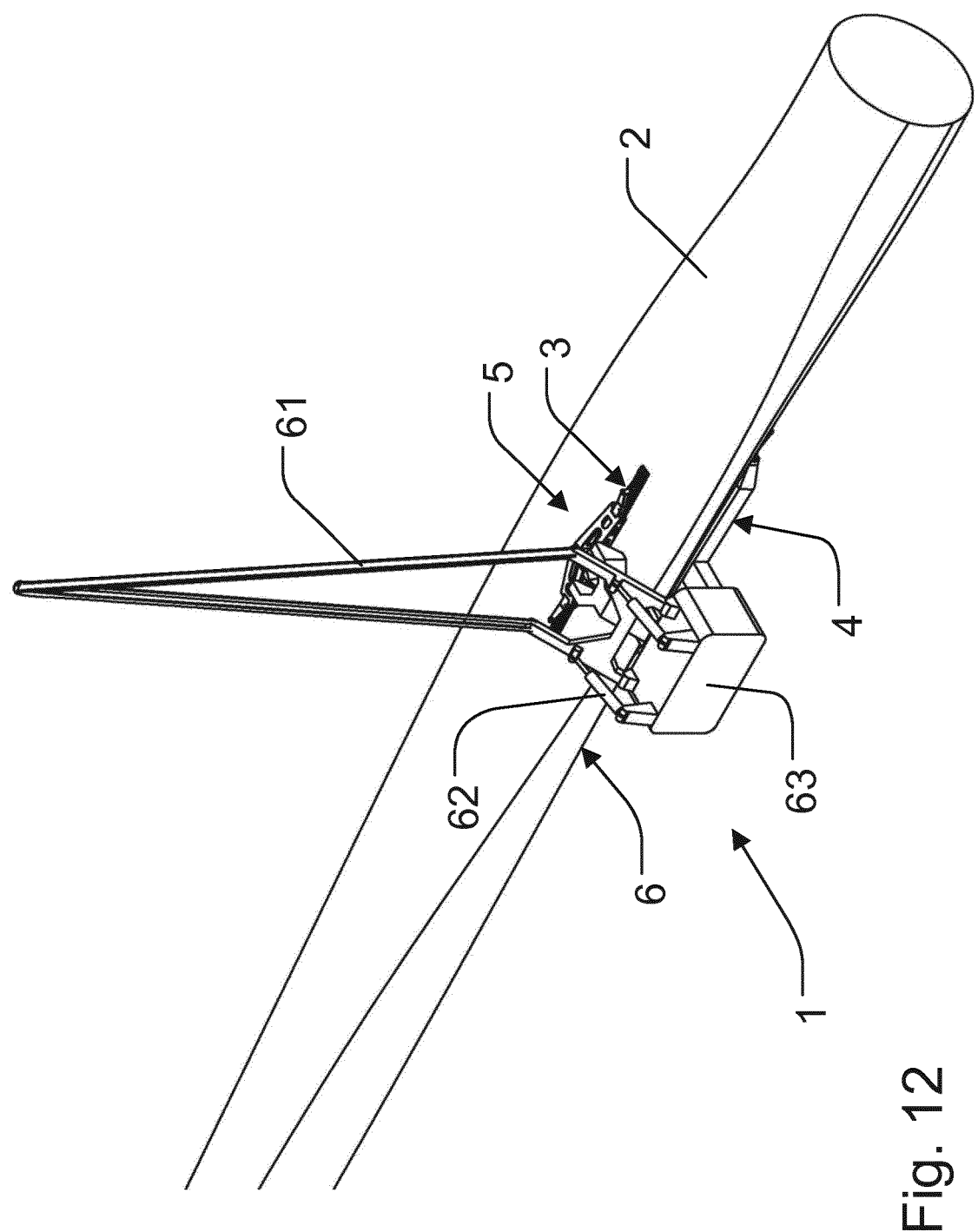
Figure 13:
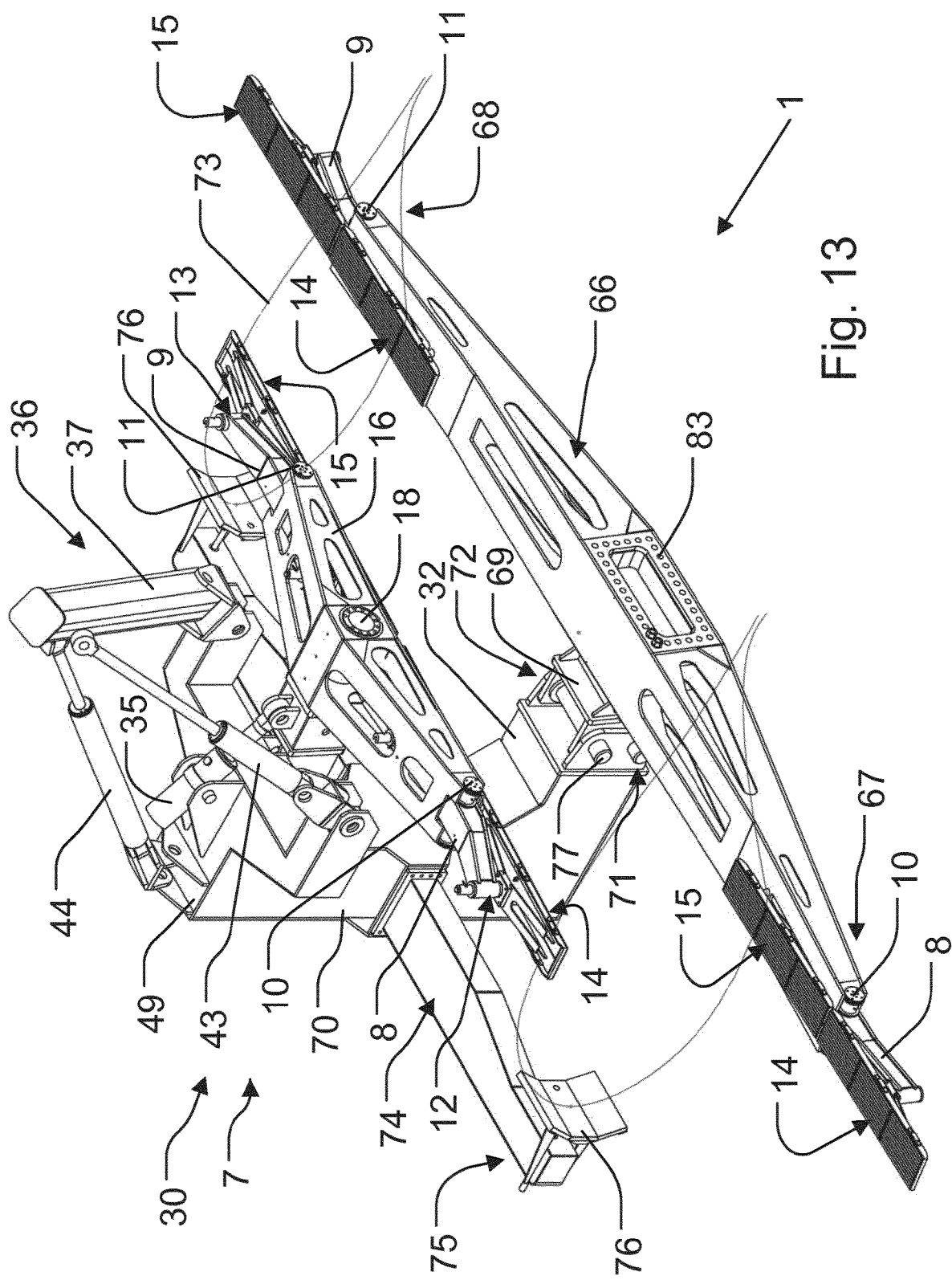
Figure 14:
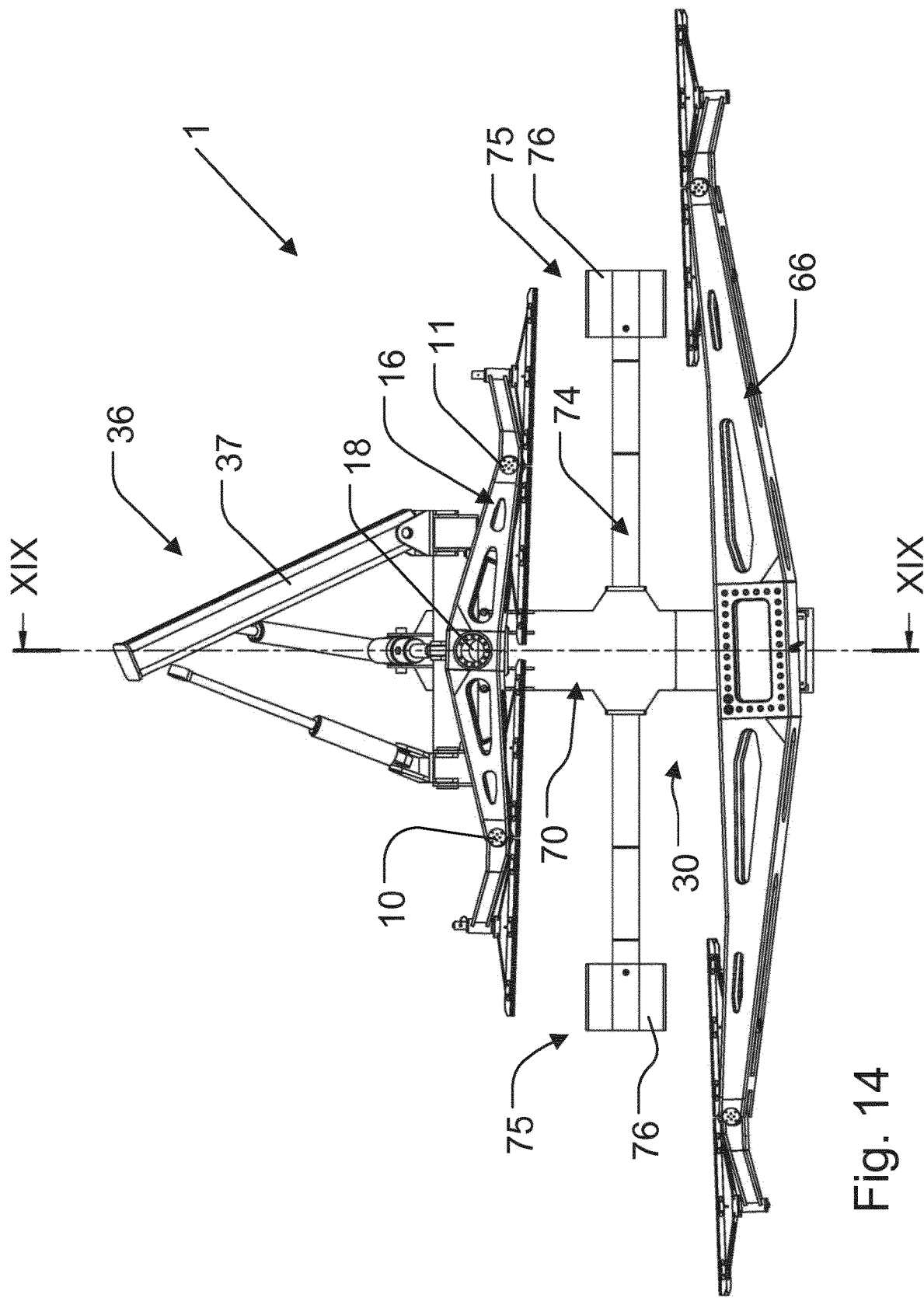
Figure 15:
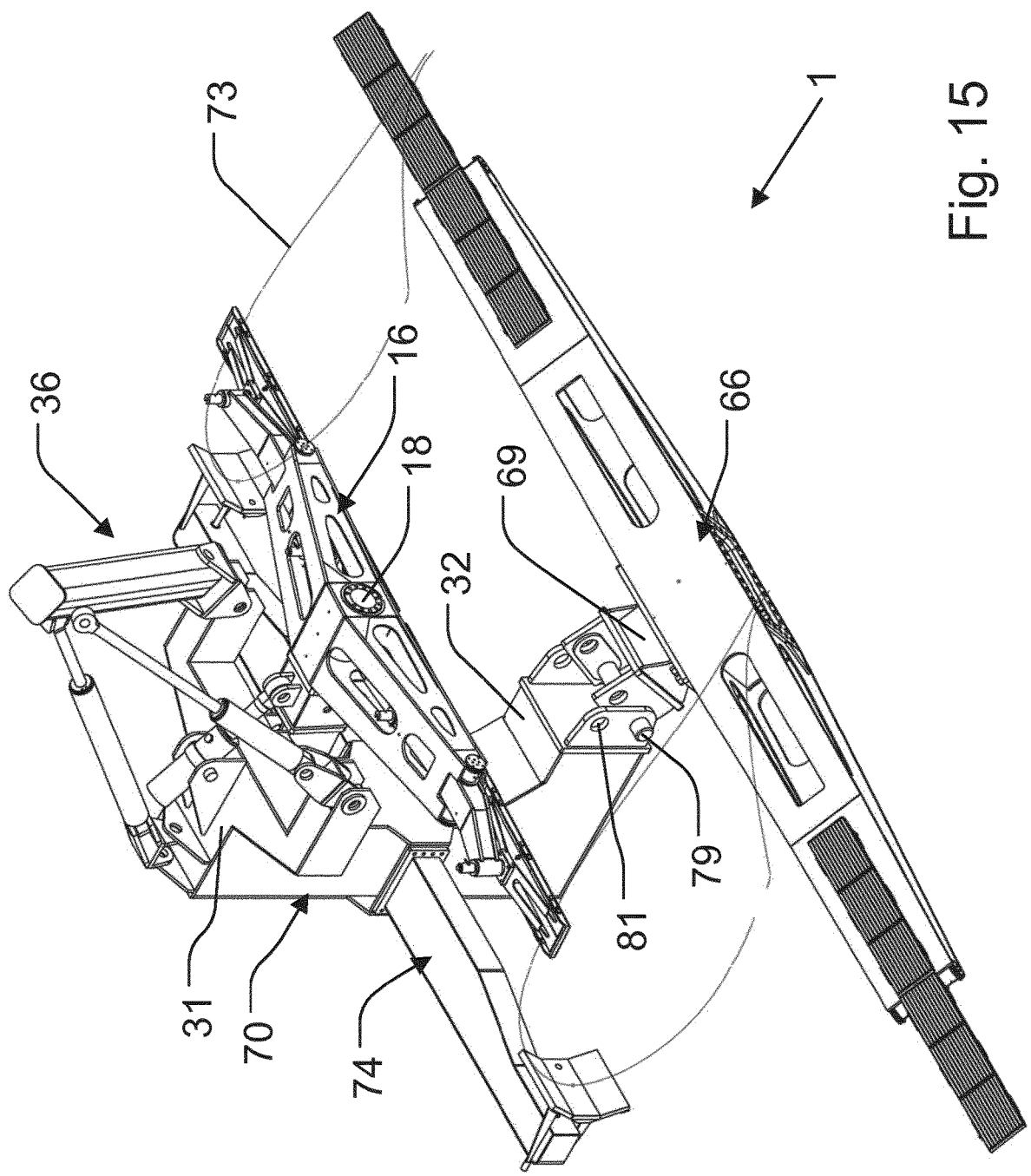
Figure 16:
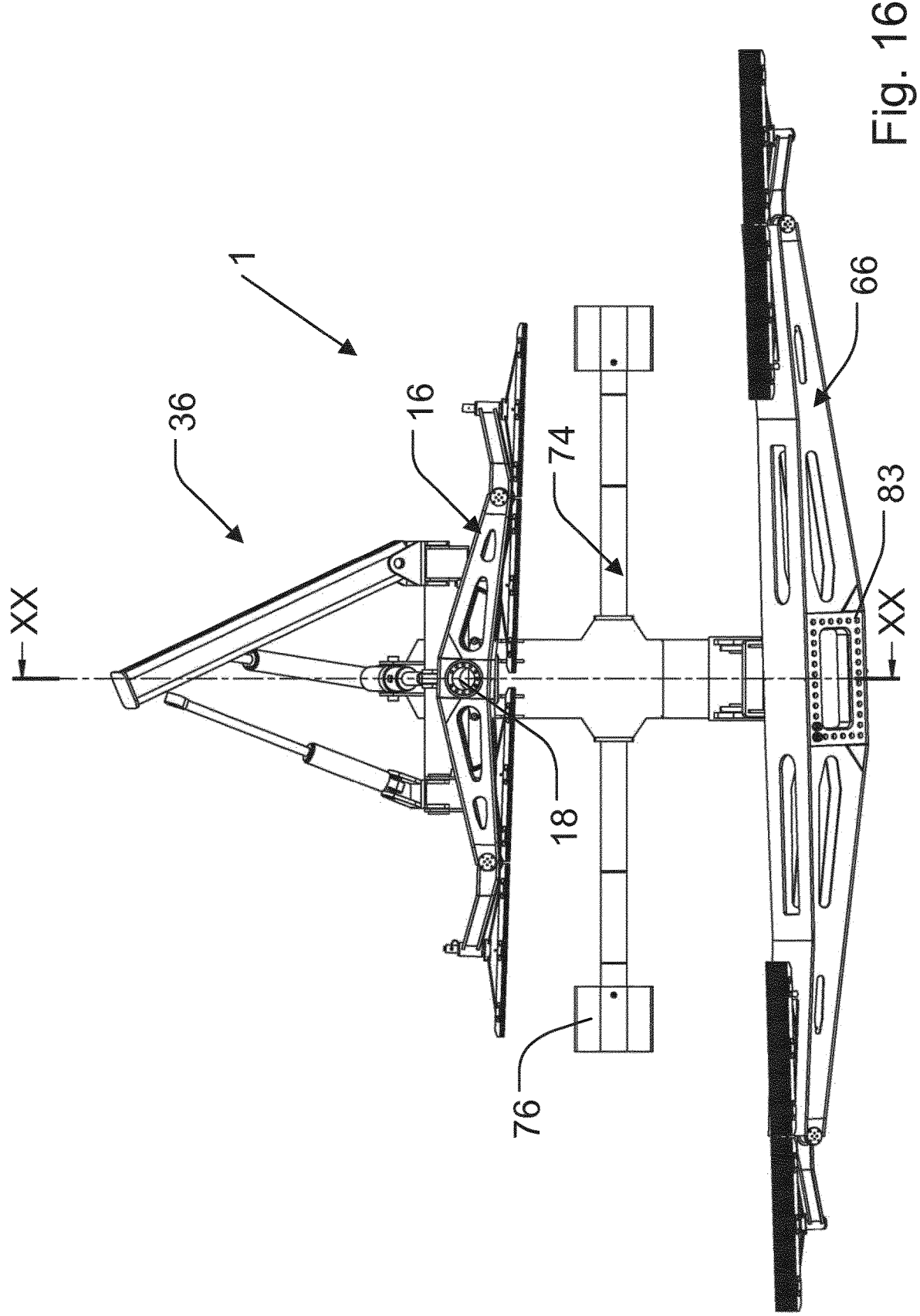
Figure 17:
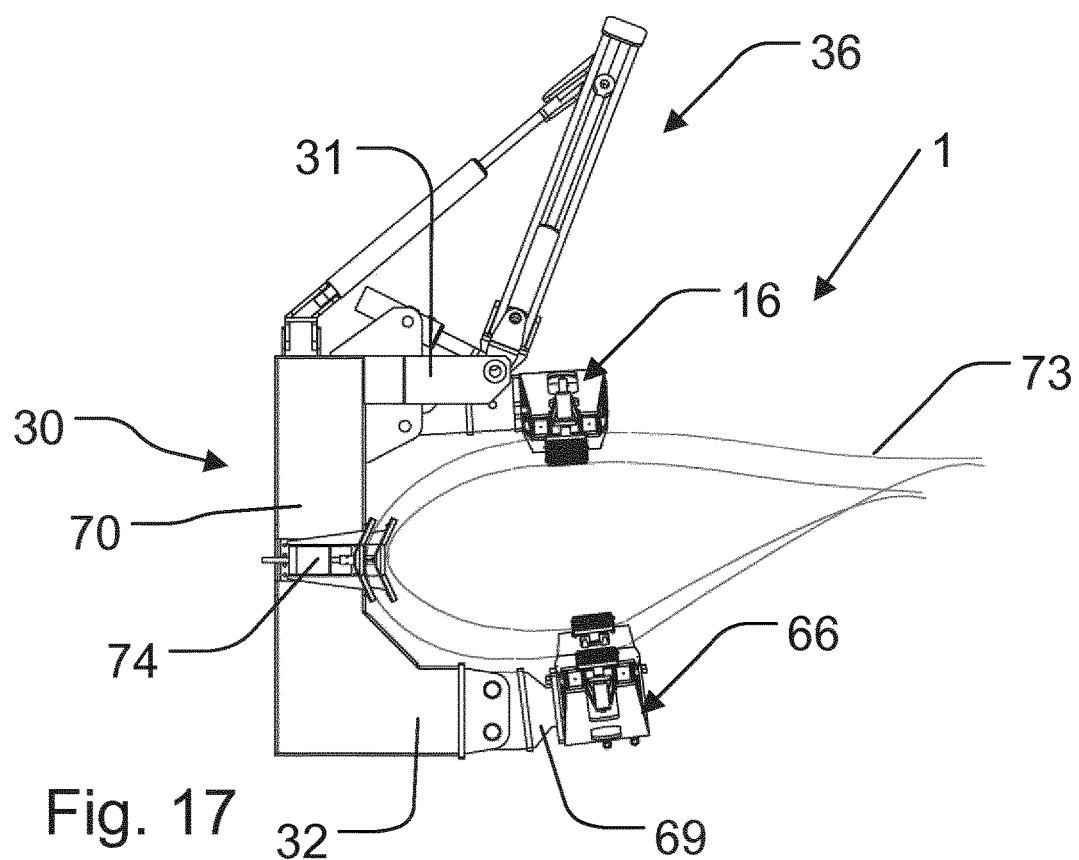
Figure 18:
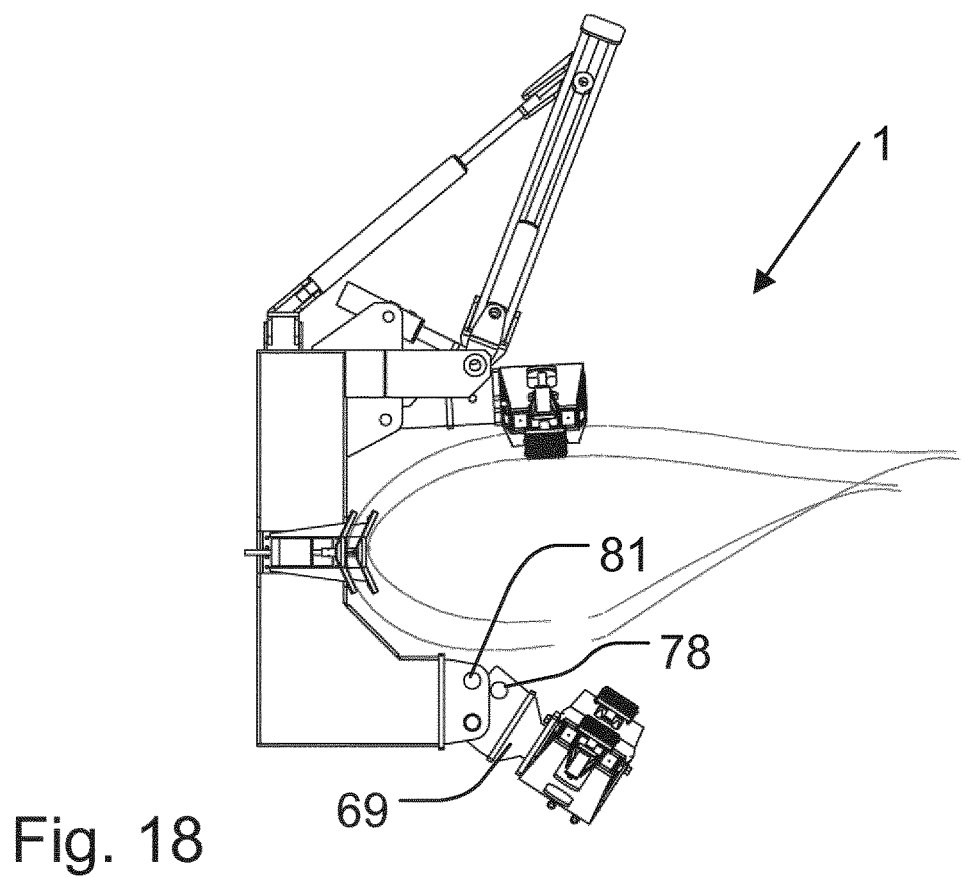
Figure 19:
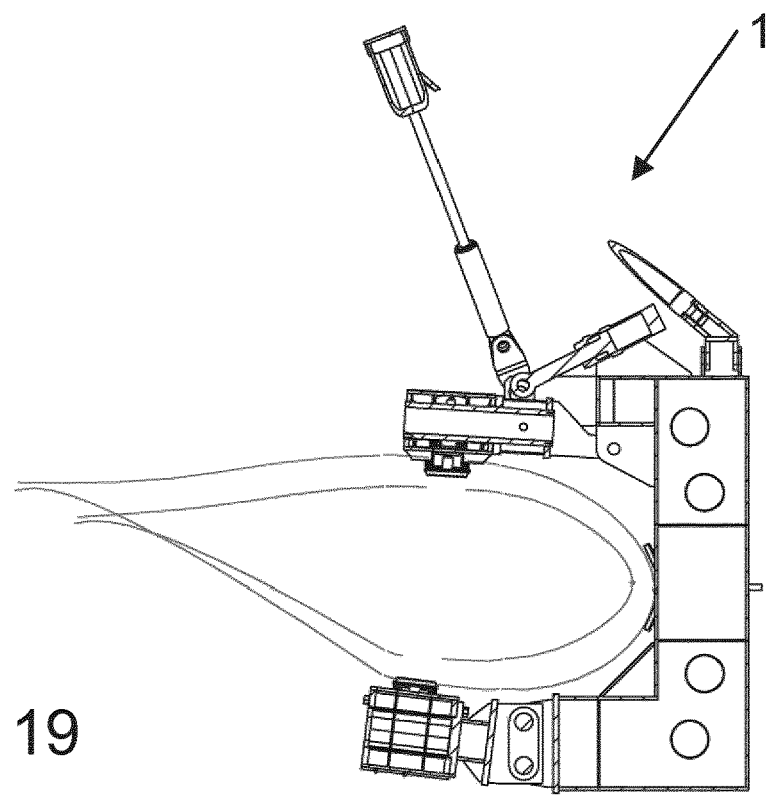
Figure 20:
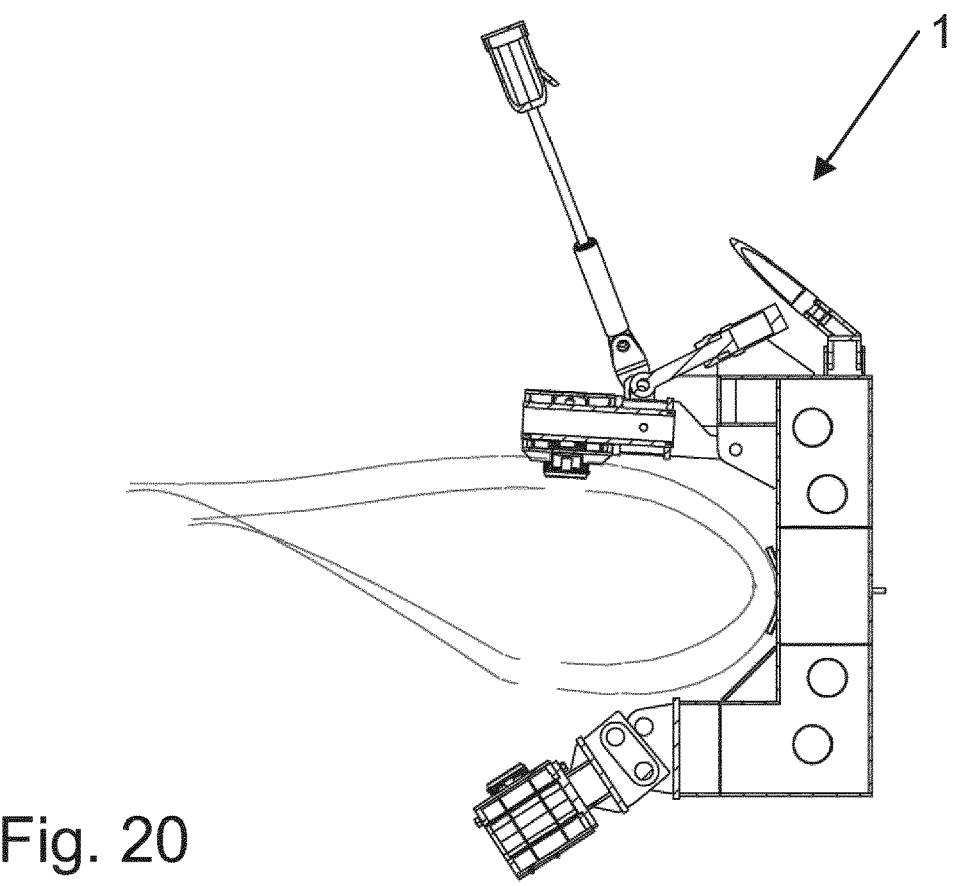

The invention will now be explained in more detail below by means of examples of embodiments with reference to the very schematic drawing, in which FIG. 1 is a perspective view of a rotor blade clamping tool according to the invention, FIG. 2 is a perspective view of the rotor blade clamping tool of FIG. 1, seen from a different angle, FIG. 3 is a cross-section of the rotor blade clamping tool of FIG. 1 along a plane extending through both legs of a C-formed bracket of the tool, FIG. 4 is a cross-section of the rotor blade clamping tool of FIG. 1 along a plane extending through the main balancing levers of both the first and second clamping elements, FIG. 5 is a side view of the first clamping element of the rotor blade clamping tool of FIG. 1, FIG. 6 is a longitudinal cross-section through first clamping element of FIG. 5, FIG. 7 is a longitudinal cross-section through part of the first clamping element of FIG. 5, seen in perspective, FIG. 8 is a top view of a rotor blade contacting element of the first clamping element of FIG. 5, FIG. 9 is a perspective cross-sectional view of the rotor blade contacting element of FIG. 8, FIG. 10 is a cross-sectional view through the rotor blade contacting element of FIG. 8, FIG. 11 is a perspective view of the rotor blade clamping tool of FIG. 1, carrying a rotor blade, FIG. 12 is a perspective view of another embodiment of the rotor blade clamping tool according to the invention, carrying a rotor blade, FIG. 13 is a perspective view of yet another embodiment of the rotor blade clamping tool according to the invention, whereby the second clamping element is in a clamping position, FIG. 14 is a side view of the rotor blade clamping tool of FIG. 13, whereby the second clamping element is in the clamping position, FIG. 15 is a perspective view of the rotor blade clamping tool of FIG. 13, whereby the second clamping element is in an insertion position, FIG. 16 is a side view of the rotor blade clamping tool of FIG. 13, whereby the second clamping element is in the insertion position, FIG. 17 is an end view of the rotor blade clamping tool of FIG. 13, whereby the second clamping element is in the clamping position, FIG. 18 is an end view of the rotor blade clamping tool of FIG. 13, whereby the second clamping element is in the insertion position, FIG. 19 is a cross-sectional view of the rotor blade clamping tool along the line XIX-XIX of FIG. 14, whereby the second clamping element is in the clamping position, FIG. 20 is a cross-sectional view of the rotor blade clamping tool along the line XX-XX of FIG. 16, whereby the second clamping element is in the insertion position, FIG. 21 is a perspective view of an exchangeable adapter piece, FIG. 22 is an end view of the exchangeable adapter piece of FIG. 21, and FIG. 23 is a side view of the exchangeable adapter piece of FIG. 21.

FIGS. 1 and 2 show an embodiment of a rotor blade clamping tool 1 according to the present invention, for lifting a wind turbine rotor blade 2. FIGS. 13 to 20 illustrate another embodiment of the rotor blade clamping tool 1 according to the present invention. The clamping tool includes a first clamping element 3 adapted to be arranged at a first side 5 of the rotor blade 2 and a second clamping element 4 adapted to be arranged at a second side 6 of the rotor blade, as illustrated in FIG. 11. A clamping mechanism 7 connects the first clamping element 3 and the second clamping element 4 and is adapted to open the clamping tool 1 for insertion of the rotor blade 2 between the first and second clamping elements 3, 4 and close the clamping tool 1 for clamping the rotor blade 2 between the first and second clamping elements 3, 4.

In this embodiment, each one of the first and second clamping elements 3, 4 includes a main balancing lever 16, 17 being arranged pivotally about a main pivot axis 18, 19 and having a first end 20 on which a corresponding first balancing lever 8 is arranged pivotally about a corresponding first pivot axis 10 and a second end 21 on which a corresponding second balancing lever 9 is arranged pivotally about a corresponding second pivot axis 11. Each balancing lever 8, 9 has a first end 12 flexibly connected with a corresponding first rotor blade contacting surface 14 and a second end 13 flexibly connected with a corresponding second rotor blade contacting surface 15. As seen, those first and second balancing levers 8, 9 which arranged on the same main balancing lever 16, 17 are aligned in their longitudinal direction.

As illustrated in FIGS. 7, 9 and 10, the flexible connection between each end 12, 13 of the balancing levers 8, 9 and the corresponding rotor blade contacting surface 14, 15 has the form of a ball joint 51 with limited movement. The ball joint 51 is formed by a connection element 52 having a partly spherical head 53 arranged in a cylindrical bore 54 having a conical bottom 55. A shaft 56 of the connection element 52 is arranged in a cylindrical bore 57 formed in the corresponding end 12, 13 of the corresponding balancing lever 8, 9, and the cylindrical bore 54 in which the partly spherical head 53 of the connection element 52 is arranged is formed on the corresponding first or second longitudinal contact element 22, 23 forming the corresponding rotor blade contacting surface 14, 15. The shaft 56 of the connection element 52 is adjustable in the longitudinal direction of the cylindrical bore 57 of the corresponding balancing lever 8, 9 by means of a not shown screw inserted into a threaded hole 58 in the end of the shaft 56 of the connection element 52. Furthermore, rotation of the shaft 56 of the connection element 52 in the cylindrical bore 57 is prevented by means of a key 59 fitting corresponding keyways of the shaft 56 of the connection element 52 and the cylindrical bore 57. The partly spherical head 53 is maintained flexibly in the cylindrical bore 54 against the conical bottom 55 by means of a rubber ring 60 arranged above the head 53. Furthermore, the movement of the ball joint 51 is limited by means of a pin 64 inserted through a corresponding bore extending through the partly spherical head 53. The ends of the pin 64 are arranged in corresponding opposite grooves 65 formed longitudinally in the wall of the cylindrical bore 54 formed in the corresponding first or second longitudinal contact element 22, 23 so that the pin 64 extends generally in the longitudinal direction of the corresponding longitudinal contact element 22, 23. In this way, the rotation of the ball joint 51 is limited to certain angles of rotation about the longitudinal axis of the shaft 56 and about an axis extending at right angles to the longitudinal axis of the shaft 56 and extending at right angles to the longitudinal direction of the corresponding longitudinal contact element 22, 23.

As seen in FIGS. 1 to 4, 11 and 13 to 20, the clamping tool 1 is provided with a hoisting attachment 36 arranged so that, during hoisting, the first clamping element 3 is arranged at a generally upward side 5 of the rotor blade 2, and the second clamping element 4 is arranged at a generally downward side 6 of the rotor blade 2. Generally, according to the present invention, the four separate rotor blade contacting surfaces 14, 15 of the first and second clamping elements 3, 4 are adapted to be arranged successively in the lengthwise direction of the rotor blade. As seen, in the embodiment illustrated in FIGS. 1 to 4 and 11, the distance between the first and second pivot axes 10, 11 of the main balancing lever 17 of the second clamping element 4 is longer than the distance between the first and second pivot axes 10, 11 of the main balancing lever 16 of the first clamping element 3. Preferably, the distance between the first and second pivot axes 10, 11 of the main balancing lever 17 of the second clamping element 4 is at least 1.5 times, more preferred at least 2 times, and most preferred about 2.5 times, the distance between the first and second pivot axes 10, 11 of the main balancing lever 16 of the first clamping element 3.

As seen in FIGS. 5 to 8, the first rotor blade contacting surface 14 and the second rotor blade contacting surface 15 of each balancing lever 8, 9 has the form of respective longitudinal contact elements 22, 23 being aligned in their longitudinal direction and being arranged substantially end to end, but with enough clearance to allow mutual movement, thereby forming a total rotor blade contacting surface 24, 25 of the respective balancing lever 8, 9. Each longitudinal contact element 22, 23 is provided with a contact surface formed by a suitable material, such as rubber or the like, for achieving a suitably high friction between the longitudinal contact element 22, 23 and the surface of the rotor blade. Alternatively, the contact surface may in fact by formed by one piece of flexible material extending over all contact elements 22, 23 belonging to the respective main balancing lever 16, 17. Said contact surface may suitably be formed with ribs and/or grooves or the like therein in order to obtain better grip.

In the embodiment illustrated in FIGS. 13 to 16, the first clamping element 3 includes a main balancing lever 16 arranged pivotally about the main pivot axis 18 just as in the embodiment illustrated in FIGS. 1 to 4. However, in the embodiment illustrated in FIGS. 13 to 16, the second clamping element 4 includes a crossbar 66 arranged on the clamping mechanism 7 and having a first end 67 on which a corresponding first balancing lever 8 is arranged pivotally about a corresponding first pivot axis 10 and a second end 68 on which a corresponding second balancing lever 9 is arranged pivotally about a corresponding second pivot axis 11. The first and second balancing levers 8, 9 arranged on the crossbar 66 are aligned in their longitudinal direction. Furthermore, the crossbar 66 is fixed against rotation in relation to the clamping mechanism 7 about any axis extending at least substantially in parallel with the main pivot axis 18 of the first clamping element 3. Because the crossbar 66 is fixed against rotation in relation to the clamping mechanism 7 about any axis more or less parallel with the main pivot axis 18 of the first clamping element 3, the wind turbine blade may be held in a fixed orientation in relation to the rotor blade clamping tool 1. Thereby, the handling of the wind turbine blade by means of the clamping tool 1 may be facilitated.

The clamping tool 1 illustrated in FIGS. 13 to 16 is provided with a hoisting attachment 36 arranged so that, during hoisting, the first clamping element 3 is adapted to be arranged at a generally upward side 5 of the rotor blade 2, and the second clamping element 4 is adapted to be arranged at a generally downward side 6 of the rotor blade 2.

Furthermore, as seen in FIGS. 1, 2, 4 and 13 to 16, on the first clamping element 3, the total rotor blade contacting surface 24 of the first balancing lever 8 and the total rotor blade contacting surface 25 of the second balancing 9 lever are arranged substantially end to end, but with enough clearance to allow mutual movement, whereas, on the second clamping element 4, the total rotor blade contacting surface 24 of the first balancing lever 8 and the total rotor blade contacting surface 25 of the second balancing lever 9 are spaced at a distance D indicated in FIG. 4. As further indicated, the total rotor blade contacting surface 24, 25 of the first or second balancing lever 8, 9 of the first clamping element 3 has a length L. In the illustrated embodiment, D is approximately 5/3×L. Furthermore, as seen, the combined length, on the first clamping element 3, of the total rotor blade contacting surface 24 of the first balancing lever 8 and the total rotor blade contacting surface 25 of the second balancing lever 9 is slightly more than 2 L. According to the invention, it is preferred that D is greater than 65 percent of, more preferred greater than 70 percent of, and most preferred greater than 75 percent of said combined length of 2 L.

As seen in FIGS. 5 to 7, the main balancing lever 16 of the first clamping element 3 includes a first and a second lever wall 26, 27 arranged in spaced and parallel configuration and being fixed to each other by means of a top plate 28 and a bottom plate 29, and the corresponding first and second balancing levers 8, 9 extend at least partly between the first and second lever wall 26, 27.

As seen in FIGS. 1 to 4, the clamping mechanism 7 connecting the first clamping element 3 and the second clamping element 4 includes a rigid C-formed bracket 30 having a first leg 31 and a second leg 32. A main bearing bracket 33 for the main balancing lever 16 of the first clamping element 3 is hinged to the first leg 31 of the C-formed bracket 30 and is pivotal in relation to the first leg 31 by means of a clamping actuator 35. A main bearing 34 for the main balancing lever 17 of the second clamping element 4 is arranged directly on the second leg 32 of the C-formed bracket 30.

In the embodiment illustrated in FIGS. 13 to 16, the clamping mechanism 7 connecting the first clamping element 3 and the second clamping element 4 includes a rigid C-formed bracket 30 having a first leg 31 and a second leg 32. A main bearing bracket 33 for a main balancing lever 16 of the first clamping element 3 is hinged to the first leg 31 of the C-formed bracket 30 and is pivotal in relation to the first leg 31 by means of a clamping actuator 35. The crossbar 66 of the second clamping element 4 is arranged on the second leg 32 of the C-formed bracket 30 by means of an exchangeable adapter piece 69 bolted to the crossbar 66 and arranged to maintain a certain angle between a longitudinal direction of the crossbar 66 and an intermediate part 70 of the rigid C-formed bracket 30 connecting the first and second legs 31, 32 of the rigid C-formed bracket 30. The exchangeable adapter piece 69 is bolted to the crossbar 66 in that the exchangeable adapter piece 69 is provided with a number of bolt holes 82 on a flange 84 of the exchangeable adapter piece 69 corresponding to bolt holes 83 of the crossbar 66. The flange 84 is further provided with a protrusion 85 matching a not shown corresponding recess of the crossbar 66.

The exchangeable adapter piece 69 is connected to the second leg 32 of the C-formed bracket 30 by means of a hinge 71 having a hinge axis extending in the longitudinal direction of the crossbar 66 so that the second clamping element 4 is swingable between an insertion position for insertion of the rotor blade 2 between the first and second clamping elements 3, 4 as illustrated in FIGS. 15, 16, 18 and 20 and a clamping position suitable for clamping the rotor blade 2 between the first and second clamping elements 3, 4 as illustrated in FIGS. 13, 14, 17 and 19. The hinge 71 is formed by insertion of a hinge pin 79 into hinge holes 80 of the second leg 32 of the C-formed bracket 30 and of the exchangeable adapter piece 69, respectively.

The exchangeable adapter piece 69 is illustrated in further details in FIGS. 21 to 23.

In a not illustrated embodiment, the second clamping element 4 is swingable between the insertion position and the clamping position by means of a hydraulic actuator.

In the embodiment illustrated in FIGS. 13 to 20, the exchangeable adapter piece 69 is adapted to be locked in the clamping position by means of a locking arrangement 72 in the form of a locking pin 77 insertable into a locking hole 78 of the exchangeable adapter piece and a corresponding locking hole 81 of the second leg 32 of the C-formed bracket 30 and thereby connecting the exchangeable adapter piece 69 to the second leg 32 of the C-formed bracket 30.

In the embodiment illustrated in FIGS. 13 to 20, the intermediate part 70 of the rigid C-formed bracket 30 is provided with a transverse bar 74 having opposed ends 75 each being provided with a supporting piece 76 adapted to support a leading edge or a trailing edge of a wind turbine blade held by the rotor blade clamping tool 1.

By means of the exchangeable adapter piece 69 bolted to the crossbar 66, an angle suitable for the specific wind turbine blade to be handled may be obtained between a longitudinal direction of the crossbar 66 and the intermediate part 70 of the rigid C-formed bracket 30. Thereby, the rigid C-formed bracket 30 may for instance be handled with its intermediate part 70 extending in an at least substantially vertical direction as best illustrated in FIGS. 14 and 16. Thereby, handling of the wind turbine blade may be facilitated. In the embodiments illustrated in FIGS. 1 to 11 and in FIGS. 13 to 16, the clamping tool 1 is provided with a hoisting attachment 36 in the form of a hoisting arm 37 having a first end 38 being connected to the clamping mechanism 7 by means of a pivot element 40 and a second end 39 adapted to connect to a cable of a hoisting crane or the like by means of an eyebolt 50. The pivot element 40 allows pivotal movement of the hoisting arm 37 in relation to the clamping tool 1 about two different axes 41, 42 being at right angles to each other, and the hoisting arm 37 is pivotal about said axes by means of a respective first and second hoist actuator 43, 44. Thereby, the angle of the clamping tool 1 and thereby the angle of the rotor blade 2 carried by the tool 1 may be varied during handling of the rotor blade so that, for instance, the blade may be positioned correctly in relation to the wind turbine hub when the blade 2 is to be mounted thereon.

The first leg 31 of the C-formed bracket 30 forms a fork element 45 having a first leg 46 and a second leg 47 carrying a hinge axis 48 therebetween on which the first clamping element 3 is hinged to the first leg 31 of the C-formed bracket 30. The first end 38 of the hoisting arm 37 is connected to the first leg 46 of the fork element 45 by means of the pivot element 40, the first hoist actuator 43 is arranged between the second leg 47 of the fork element 45 and the hoisting arm 37, and the second hoist actuator 44 is arranged between a central part 49 of the fork element 30 and the hoisting arm 37.

In an alternative embodiment of the clamping tool 1 illustrated in FIGS. 1 to 11 and in FIGS. 13 to 16, the clamping tool 1 may be adapted to be used in a not shown rotor blade hoisting system for installation and/or deinstallation of a rotor blade on a hub of a wind turbine, wherein the rotor blade hoisting system includes an upper cable support system adapted to be mounted on a top end of the wind turbine, a lower cable support system adapted to be arranged at a lower end of the wind turbine at a distance from the wind turbine, and at least a left and a right cable both adapted to be extended, in spaced relationship, between the upper cable support system and the lower cable support system. In this alternative embodiment of the clamping tool 1 according to the invention, the clamping tool 1 may be adapted to be arranged with the central part of the C-formed bracket 30 above the rotor blade 2, the first leg 31 of the C-formed bracket to the left, at a first pressure or suction side of the rotor blade, and the second leg 32 of the C-formed bracket to the right, at a second pressure or suction side of the rotor blade. The hoisting attachment 36 may therefore be replaced by means of a left climbing system arranged on the first leg 31 of the C-formed bracket and adapted to climb on the left cable and a right climbing system arranged on the second leg 32 of the C-formed bracket and adapted to climb on the right cable, each of the left and the right climbing systems including at least a first and a second roller adapted to roll on the respective cable and adapted to, when the clamping system is clamped onto the rotor blade, be spaced in a longitudinal direction of the rotor blade so that the first rollers are placed nearer a root end of the rotor blade than the second rollers, and wherein at least one of the first and second rollers of each of the left and the right climbing systems is a motor driven roller. In this alternative embodiment of the clamping tool 1, it may be preferred that, on both the first and second clamping elements 3, 4, the total rotor blade contacting surface 24 of the first balancing lever 8 and the total rotor blade contacting surface 25 of the second balancing lever 9 are spaced at a distance D indicated in FIG. 4.

FIG. 12 illustrates an alternative embodiment of the rotor blade clamping tool 1 according to the invention, carrying a rotor blade 2. According to this embodiment, the clamping tool 1 is carried by means of a different hoisting attachment 36 in the form of a V-formed bracket 61 having an upper end adapted to connect to a cable of a hoisting crane or the like and having a lower end being tiltable in relation to an actuator box 63 arranged on the C-formed bracket 30 about an axis being substantially parallel to the longitudinal direction of the rotor blade 2 by means of tilting actuators 62. The actuator box 63 is arranged rotatable by means of a not shown actuator on the C-formed bracket 30 about an axis being substantially at right angles to the longitudinal direction of the rotor blade 2 and being substantially horizontal in the illustration.

LIST OF REFERENCE NUMBERS

D distance between total rotor blade contacting surface of first and second balancing lever of second clamping element
L length of total rotor blade contacting surface of first or second balancing lever of first clamping element
1 rotor blade clamping tool
2 wind turbine rotor blade
3 first clamping element
4 second clamping element
5 first side of rotor blade
6 second side of rotor blade
7 clamping mechanism
8 first balancing lever
9 second balancing lever
10 first pivot axis
11 second pivot axis
12 first end of balancing lever
13 second end of balancing lever
14 first rotor blade contacting surface
15 second rotor blade contacting surface
16 first main balancing lever
17 second main balancing lever
18 first main pivot axis
19 second main pivot axis
20 first end of main balancing lever
21 second end of main balancing lever
22 first longitudinal contact element
23 second longitudinal contact element
24 first total rotor blade contacting surface
25 second total rotor blade contacting surface
26 first lever wall of first main balancing lever
27 second lever wall of first main balancing lever
28 top plate of first main balancing lever
29 bottom plate of first main balancing lever
30 C-formed bracket
31 first leg of C-formed bracket
32 second leg of C-formed bracket
33 main bearing bracket for first main balancing lever
34 main bearing for second main balancing lever
35 clamping actuator
36 hoisting attachment
37 hoisting arm
38 first end of hoisting arm
39 second end of hoisting arm
40 pivot element
41 first axis of pivot element
42 second axis of pivot element
43 first hoist actuator
44 second hoist actuator
45 fork element
46 first leg of fork element
47 second leg of fork element
48 hinge axis of fork element
49 central part of fork element
50 eyebolt
51 ball joint
52 connection element
53 partly spherical head
54 cylindrical bore on longitudinal contact element
55 conical bottom
56 shaft of connection element
57 cylindrical bore in balancing lever
58 threaded hole in connection element
59 key
60 rubber ring
61 V-formed bracket
62 tilting actuators
63 actuator box
64 pin
65 groove in wall of cylindrical bore
66 crossbar
67 first end of crossbar
68 second end of crossbar
69 exchangeable adapter piece
70 intermediate part of rigid C-formed bracket
71 hinge
72 locking arrangement
73 cross-sectional contour of a wind turbine blade
74 transverse bar
75 end of transverse bar
76 supporting piece
77 locking pin
78 locking hole of exchangeable adapter piece
79 hinge pin
80 hinge hole
81 locking hole of second leg
82 bolt holes of exchangeable adapter piece
83 bolt holes of crossbar
84 flange of exchangeable adapter piece
85 matching protrusion of exchangeable adapter piece

The invention claimed is:

1. A rotor blade clamping tool for lifting a wind turbine rotor blade, the clamping tool comprising:
   a first clamping element adapted to be arranged at a first side of the rotor blade;
   a second clamping element adapted to be arranged at a second side of the rotor blade; and
   a clamping mechanism connecting the first clamping element and the second clamping element and being adapted to open the clamping tool for insertion of the rotor blade between the first and second clamping elements and close the clamping tool for clamping the rotor blade between the first and second clamping elements,
   wherein at least one of the first and second clamping elements includes a first balancing lever and a second balancing lever, each balancing lever being arranged pivotally about a pivot axis and having a first end flexibly connected with a corresponding first rotor blade contacting surface and a second end flexibly connected with a corresponding second rotor blade contacting surface,
   wherein the at least one of the first and second clamping elements includes a main balancing lever being arranged pivotally about a main pivot axis and having a first end on which the corresponding first balancing lever is arranged pivotally about a corresponding first pivot axis and a second end on which the corresponding second balancing lever is arranged pivotally about a corresponding second pivot axis, and in that first and second balancing levers arranged on the same main balancing lever are aligned in their longitudinal direction, and wherein the four separate rotor blade contacting surfaces of the at least one of the first and second clamping elements are adapted to be arranged successively in the lengthwise direction of the rotor blade.

2. A rotor blade clamping tool according to claim 1, wherein both the first clamping element and the second clamping element include the first and second balancing levers and the main balancing lever, wherein the clamping tool is provided with a hoisting attachment arranged so that, during hoisting, the first clamping element is adapted to be arranged at a generally upward side of the rotor blade, and the second clamping element is adapted to be arranged at a generally downward side of the rotor blade, and wherein a distance between the first and second pivot axes of the main balancing lever of the second clamping element is longer than at least 1.5 times a distance between the first and second pivot axes of a main balancing lever of the first clamping element.

3. A rotor blade clamping tool according to claim 1, wherein the first clamping element includes the main balancing lever arranged pivotally about the main pivot axis, wherein the second clamping element includes a crossbar arranged on the clamping mechanism and having a first end on which a corresponding first balancing lever is arranged pivotally about a corresponding first pivot axis and a second end on which a corresponding second balancing lever is arranged pivotally about a corresponding second pivot axis, wherein the first and second balancing levers arranged on the crossbar are aligned in their longitudinal direction, and wherein the crossbar is fixed against rotation in relation to the clamping mechanism about any axis extending at least substantially in parallel with the main pivot axis of the first clamping element.

4. A rotor blade clamping tool according to claim 1, wherein the clamping tool is provided with a hoisting attachment arranged so that, during hoisting, the first clamping element is adapted to be arranged at a generally upward side of the rotor blade, and the second clamping element is adapted to be arranged at a generally downward side of the rotor blade.

5. A rotor blade clamping tool according to claim 1, wherein the first rotor blade contacting surface and the second rotor blade contacting surface of each balancing lever has the form of respective longitudinal contact elements being aligned in their longitudinal direction and being arranged at least substantially end to end, but with enough clearance to allow mutual movement, thereby forming a total rotor blade contacting surface of the respective balancing lever.

6. A rotor blade clamping tool according to claim 5, wherein both the first clamping element and the second clamping element include the first and second balancing levers, wherein, on the first clamping element, the total rotor blade contacting surface of a first balancing lever and the total rotor blade contacting surface of a second balancing lever are arranged at least substantially end to end, but with enough clearance to allow mutual movement, and wherein, on the second clamping element, the total rotor blade contacting surface of the first balancing lever and the total rotor blade contacting surface of the second balancing lever are spaced at a distance being greater than the length of the total rotor blade contacting surface of the first or second balancing lever of the first clamping element, and greater than 65 percent of the combined length, on the first clamping element, of the total rotor blade contacting surface of the first balancing lever and the total rotor blade contacting surface of the second balancing lever.

7. A rotor blade clamping tool according to claim 1, wherein a main balancing lever of the first clamping element includes a first and a second lever wall arranged in spaced and parallel configuration and being fixed to each other by means of a top plate and a bottom plate, and wherein the corresponding first and second balancing levers extend at least partly between the first and second lever walls.

8. A rotor blade clamping tool according to claim 1, wherein both the first clamping element and the second clamping element include the first and second balancing levers and the main balancing lever, wherein the clamping mechanism connecting the first clamping element and the second clamping element includes a rigid C-formed bracket having a first leg and a second leg, wherein a main bearing bracket for the main balancing lever of the first clamping element is hinged to the first leg of the C-formed bracket and is pivotal in relation to the first leg by means of a clamping actuator, and wherein a main bearing for the main balancing lever of the second clamping element is arranged directly on the second leg of the C-formed bracket.

9. A rotor blade clamping tool according to claim 1, wherein the clamping mechanism connecting the first clamping element and the second clamping element includes a rigid C-formed bracket having a first leg and a second leg, wherein a main bearing bracket for a main balancing lever of the first clamping element is hinged to the first leg of the C-formed bracket and is pivotal in relation to the first leg by means of a clamping actuator, and wherein the second clamping element includes a crossbar arranged on the second leg of the C-formed bracket by means of an exchangeable adapter piece bolted to the crossbar and arranged to maintain a certain angle between a longitudinal direction of the crossbar and an intermediate part of the rigid C-formed bracket connecting the first and second legs of the rigid C-formed bracket.

10. A rotor blade clamping tool according to claim 9, wherein the exchangeable adapter piece is connected to the second leg of the C-formed bracket by means of a hinge having a hinge axis extending in the longitudinal direction of the crossbar so that the second clamping element is swingable between an insertion position for insertion of the rotor blade between the first and second clamping elements and a clamping position suitable for clamping the rotor blade between the first and second clamping elements.

11. A rotor blade clamping tool according to claim 10, wherein the second clamping element is swingable between the insertion position and the clamping position by means of a hydraulic actuator.

12. A rotor blade clamping tool according to claim 10, wherein the exchangeable adapter piece is adapted to be locked in the clamping position by means of a locking arrangement connecting the exchangeable adapter piece to the second leg of the C-formed bracket.

13. A rotor blade clamping tool according to claim 9, wherein the intermediate part of the rigid C-formed bracket is provided with a transverse bar having opposed ends each being provided with a supporting piece adapted to support a leading edge or a trailing edge of a wind turbine blade held by the rotor blade clamping tool.

14. A rotor blade clamping tool according to claim 1, wherein the clamping tool is provided with a hoisting attachment in the form of a hoisting arm having a first end being connected to the clamping mechanism by means of a pivot element and a second end adapted to connect to a cable of a hoisting crane or the like, wherein the pivot element allows pivotal movement of the hoisting arm in relation to the clamping tool about two different axes being at right angles to each other, and wherein the hoisting arm is pivotal about said axes by means of a respective first and second hoist actuator.

15. A rotor blade clamping tool according to claim 8, wherein the first leg of the C-formed bracket forms a fork element having a first leg and a second leg carrying a hinge axis therebetween on which the first clamping element is hinged to the first leg of the C-formed bracket, wherein the first end of the hoisting arm is connected to the first leg of the fork element by means of the pivot element, wherein the first hoist actuator is arranged between the second leg of the fork element and the hoisting arm, and wherein the second hoist actuator is arranged between the first leg of the C-formed bracket or a central part of the fork element and the hoisting arm.

16. A rotor blade clamping tool according to claim 3, wherein the clamping tool is provided with a hoisting attachment arranged so that, during hoisting, the first clamping element is adapted to be arranged at a generally upward side of the rotor blade, and the second clamping element is adapted to be arranged at a generally downward side of the rotor blade.

* * * * *